US010116675B2

(12) United States Patent
Brown et al.

(10) Patent No.: US 10,116,675 B2
(45) Date of Patent: Oct. 30, 2018

(54) METHODS AND SYSTEMS TO DETECT ANOMALIES IN COMPUTER SYSTEM BEHAVIOR BASED ON LOG-FILE SAMPLING

(71) Applicant: VMware, Inc., Palo Alto, CA (US)

(72) Inventors: Darren Brown, Seattle, WA (US);
Junyuan Lin, Seattle, WA (US);
Nicholas Kushmerick, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/963,100

(22) Filed: Dec. 8, 2015

(65) Prior Publication Data
US 2017/0163669 A1   Jun. 8, 2017

(51) Int. Cl.
*G06F 21/00*    (2013.01)
*H04L 29/06*    (2006.01)
*H04L 12/26*    (2006.01)
*G06N 7/00*     (2006.01)

(52) U.S. Cl.
CPC ......... *H04L 63/1425* (2013.01); *G06N 7/005* (2013.01); *H04L 43/067* (2013.01)

(58) Field of Classification Search
CPC ........... H04L 2209/60; H04L 29/12009; H04L 29/12066; H04L 29/12216; H04L 61/1511
See application file for complete search history.

(56) References Cited

U.S. PATENT DOCUMENTS

| | | | |
|---|---|---|---|
| 2008/0033971 A1* | 2/2008 | Carmel | G06F 17/30675 |
| 2009/0113246 A1* | 4/2009 | Sabato | G06F 11/0769 714/37 |
| 2013/0080367 A1* | 3/2013 | Tonouchi | G06N 5/02 706/46 |

* cited by examiner

*Primary Examiner* — Ghazal B Shehni

(57) ABSTRACT

Methods and systems that detect computer system anomalies based on log file sampling are described. Computers systems generate log files that record various types of operating system and software run events in event messages. For each computer system, a sample of event messages are collected in a first time interval and a sample of event messages are collected in a recent second time interval. Methods calculate a difference between the event messages collected in the first and second time intervals. When the difference is greater than a threshold, an alert is generated. The process of repeatedly collecting a sample of event messages in a recent time interval, calculating a difference between the event messages collected in the recent and previous time intervals, comparing the difference to the threshold, and generating an alert when the threshold is violated may be executed for each computer system of a cluster of computer systems.

21 Claims, 23 Drawing Sheets

METHODS AND SYSTEMS TO DETECT ANOMALIES IN COMPUTER SYSTEM BEHAVIOR BASED ON LOG-FILE SAMPLING

TECHNICAL FIELD

The present disclosure is directed to detecting anomalous behavior is server computers, and, in particular, to computational systems and methods that detect anomalous behavior in server computers based query sampling of each server computer log files.

BACKGROUND

During the past seven decades, electronic computing has evolved from primitive, vacuum-tube-based computer systems, initially developed during the 1940s, to modern electronic computing systems in which large numbers of multi-processor server computers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. Despite all of these advances, however, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed and as general hardware and software technologies continue to advance, the current trend towards ever-larger and more complex distributed computing systems appears likely to continue well into the future.

In modern computing systems, individual computers, subsystems, and components generally output large volumes of status, informational, and error messages that are collectively referred to, in the current document, as "event messages." In large, distributed computing systems, terabytes of event messages may be generated each day. The event messages are often collected into event logs stored as files in data-storage appliances and are often analyzed both in real time, as they are generated and received, as well as retrospectively, after the event messages have been initially processed and stored in event logs. Event messages may contain information that can be used to detect serious failures and operational deficiencies prior to the accumulation of a sufficient number of failures and system-degrading events that lead to data loss and significant down time. The information contained in event messages may also be used to detect and ameliorate various types of security breaches and issues, to intelligently manage and maintain distributed computing systems, and to diagnose many different classes of operational problems, hardware-design deficiencies, and software-design deficiencies. It has proved to be a challenging task for system administrators, system designers and developers, and system users to identify information within the enormous event logs generated in distributed computing systems relevant to detecting and diagnosing operational anomalies and useful in administering, managing, and maintaining distributed computer systems.

SUMMARY

The current document presents methods and systems that use log file sampling to detect computer system anomalies. Computers systems generate log files that record various types of operating system and software run events in event messages. Each event message describes the type of event and includes a time stamp that identifies when the event message was recorded in the log file. For each computer system, a sample of event messages are collected in a first time interval and a sample of event messages are collected in a recent second time interval. The event messages collected in the first time interval are a recent history that is used to identify a change in behavior of the computer system. Methods calculate a metric value that represents a difference between the event messages collected in the first and second time intervals. When the difference is greater than a threshold, an alert is generated. After a metric value has been computed, event messages continue to be collected in a third time interval. A metric value that represents a difference between the event messages collected in the second and third time intervals is calculated and checked against the threshold. The process of repeatedly collecting a sample of event messages in a recent time interval, calculating a metric value based on the event messages collected in the recent and previous time intervals, comparing the metric value to the threshold, and generating an alert when the threshold is violated is carried out separately for each of the computer systems.

DETAILED DESCRIPTION

Figure 1:
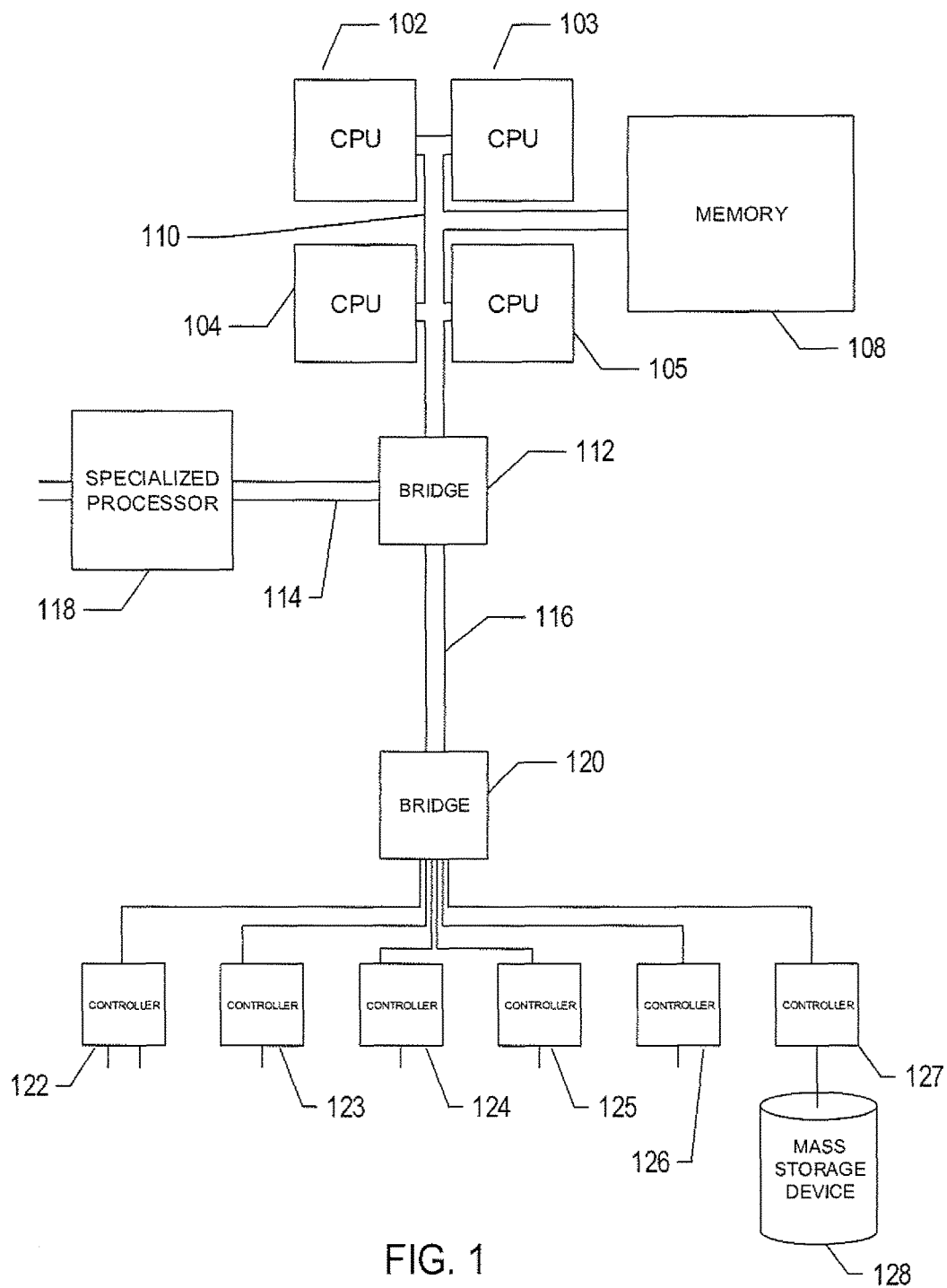
FIG. 1 shows a general architectural diagram for various types of computers.

This disclosure presents computational methods and systems to detect anomalous behavior in computer systems based on log files generated by the computer systems. In a first subsection, computer hardware, complex computational systems, and virtualization are described. Methods and systems to detect anomalous behavior in computer systems are described in a second subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and VMs, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
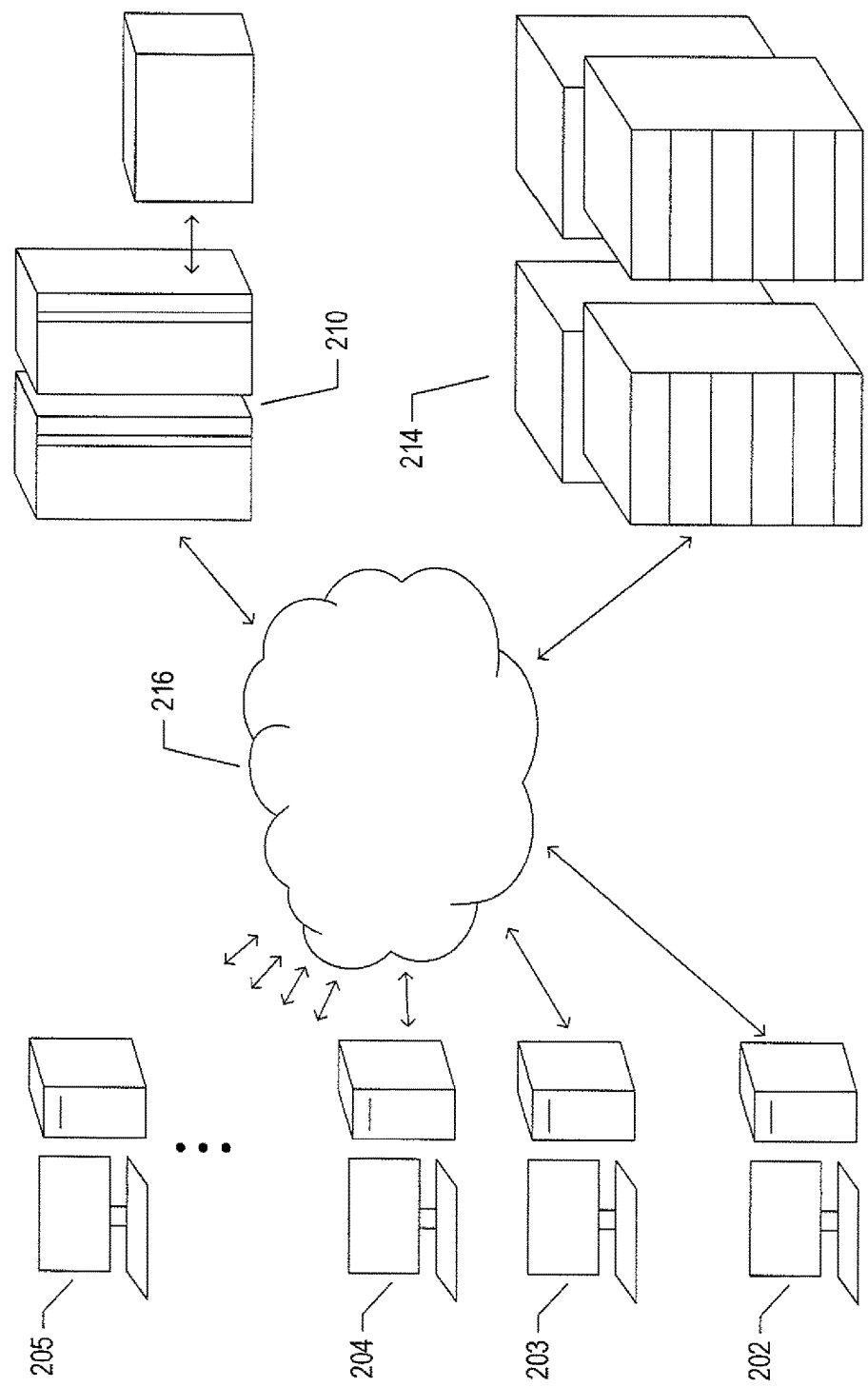
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
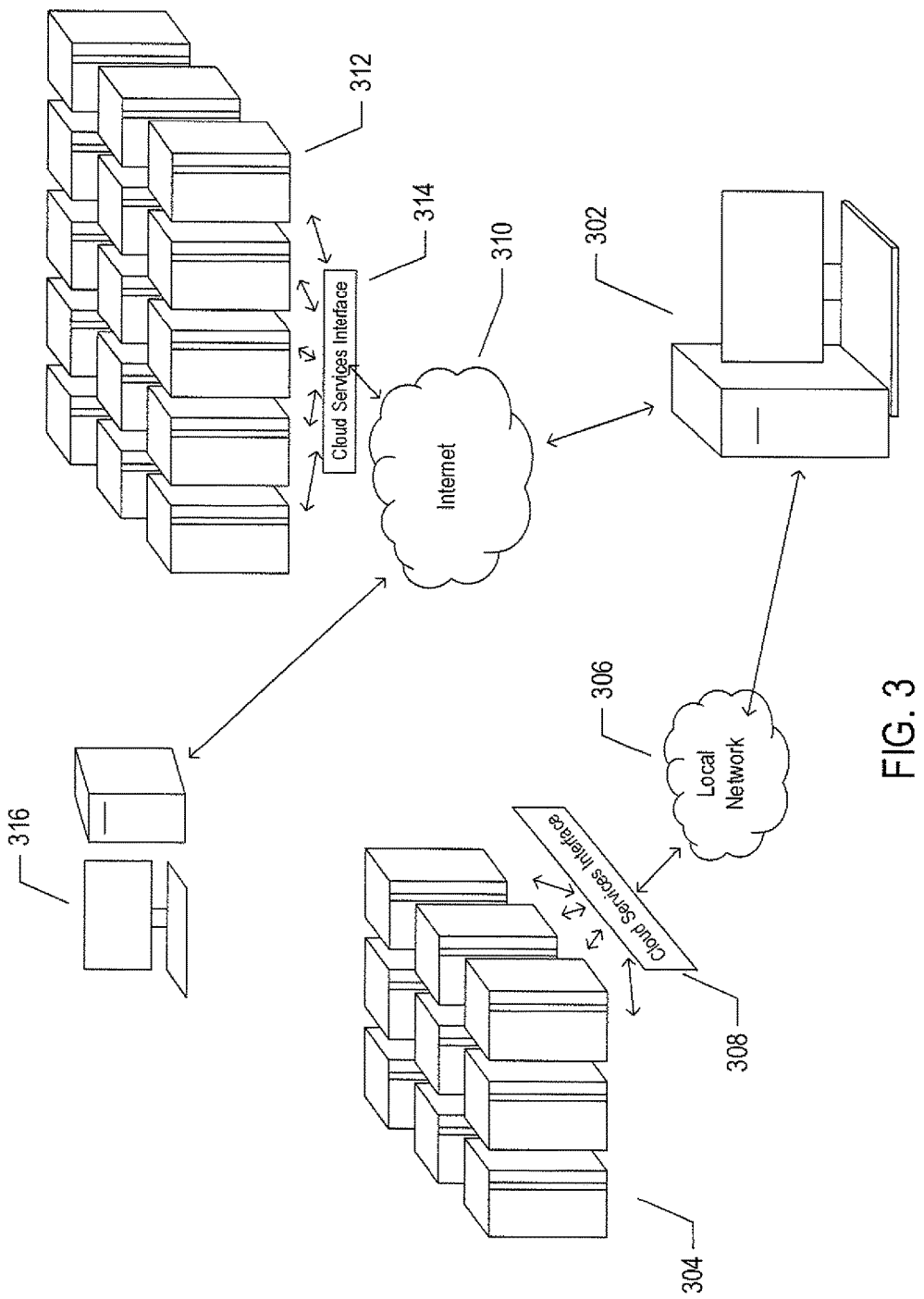
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
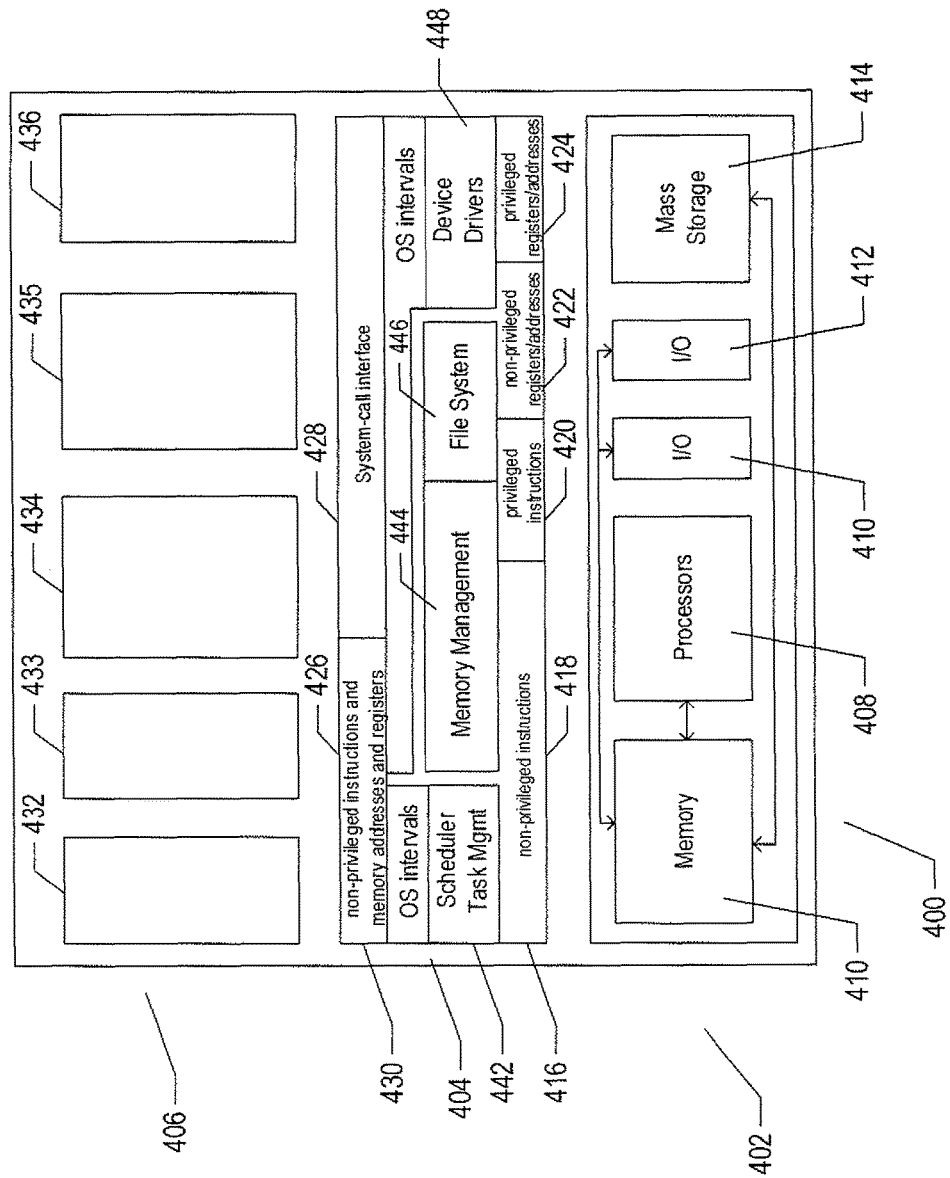
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
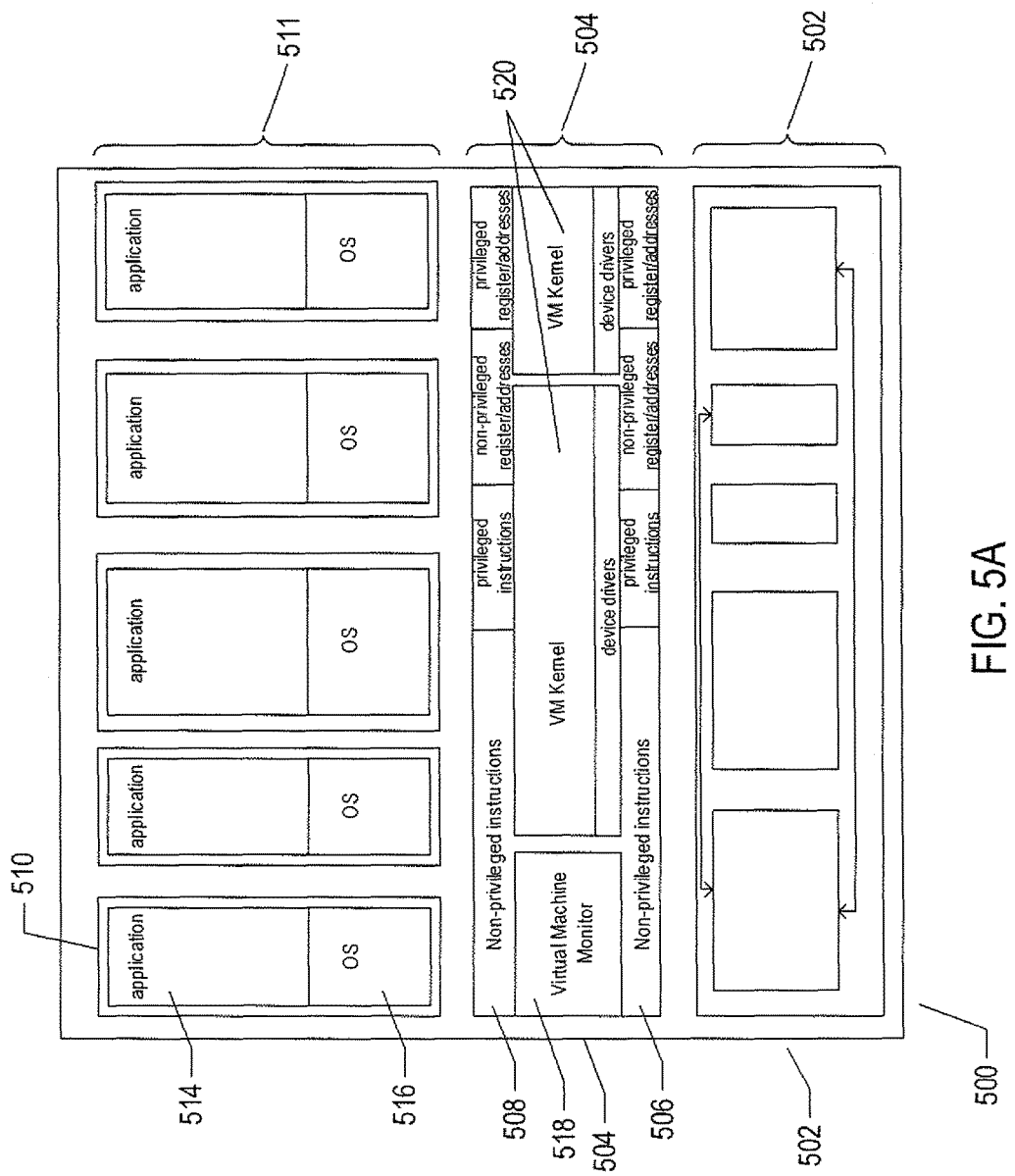
FIGS. 5A-5B show two types of virtual machine and virtual-machine execution environments.
Figure 5B:
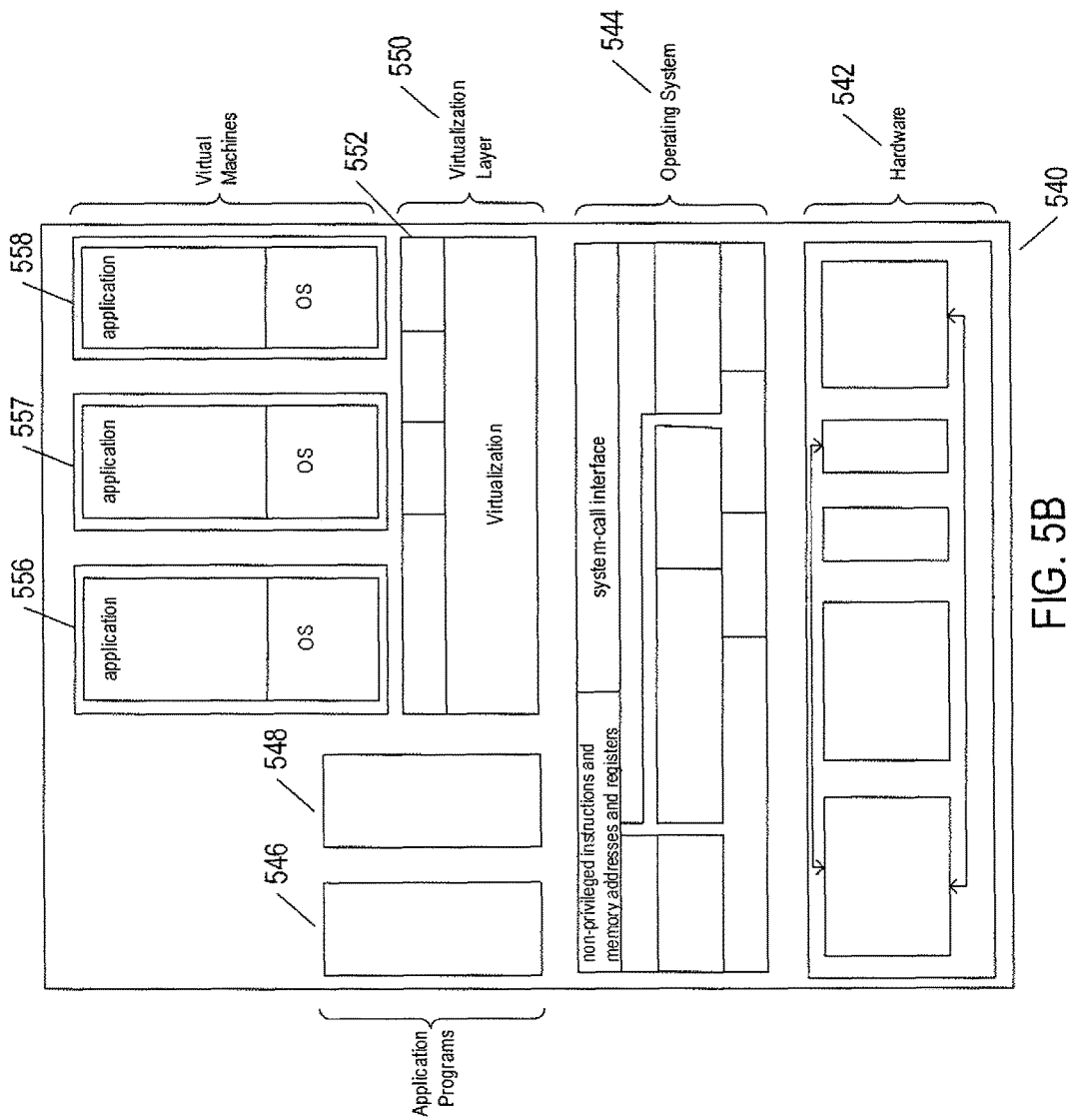

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface 508 to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization-layer interface 508 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization-layer interface 508 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization-layer interface 508, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
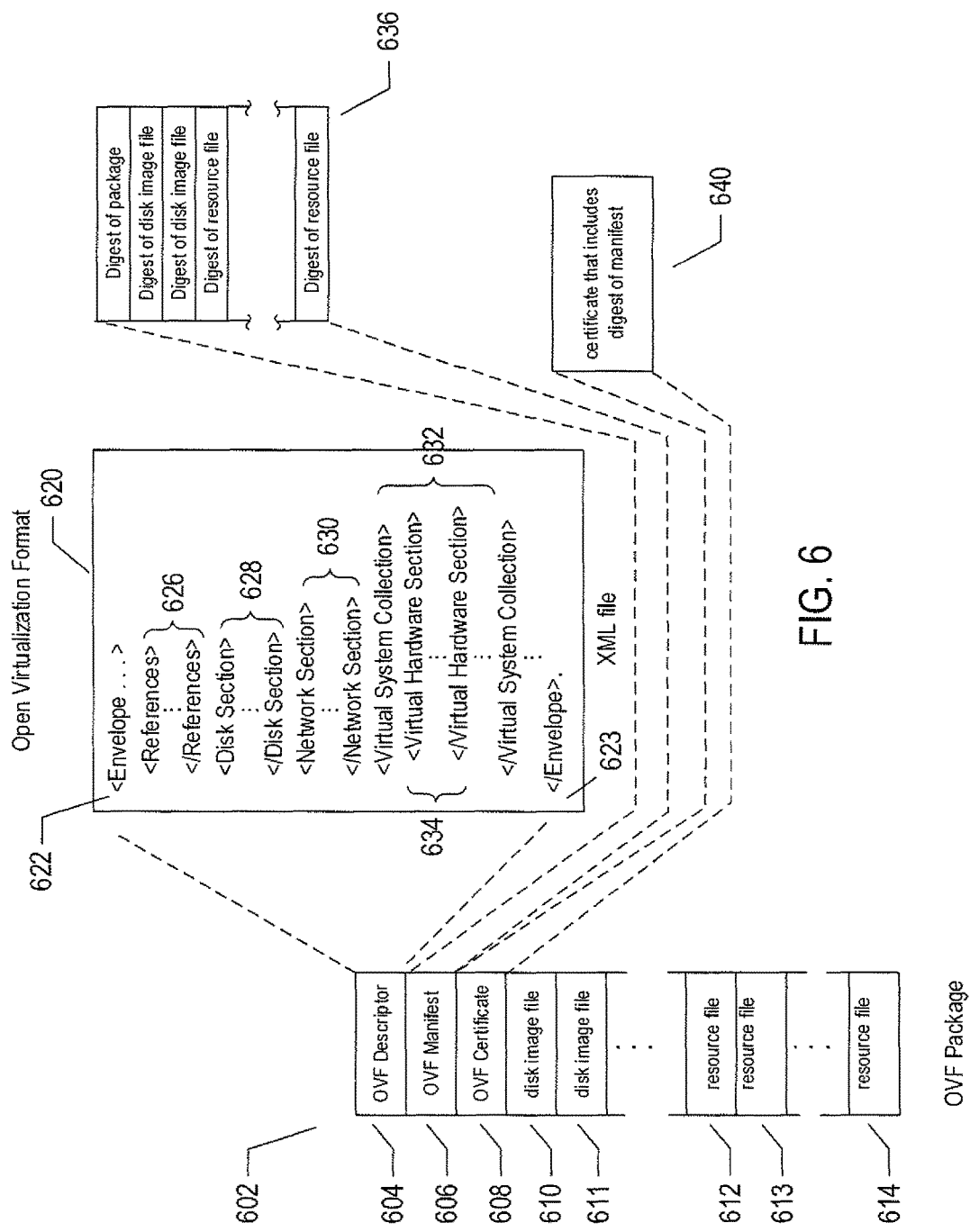
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of crypto-graphic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
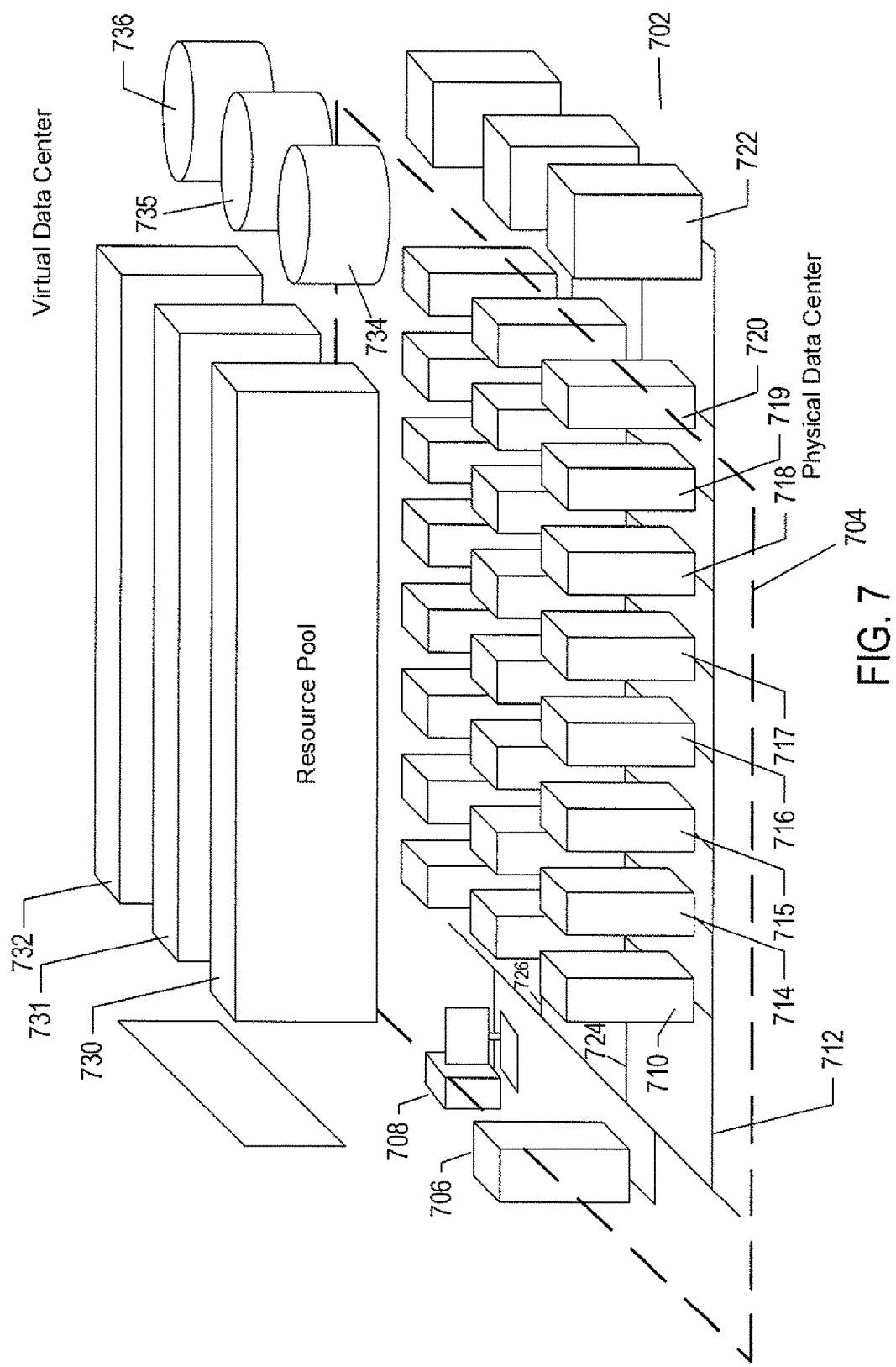
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of physical servers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server 706 includes functionality to migrate running VMs from one physical server to another in order to optimally or near optimally manage device allocation, provide fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual physical servers and migrating VMs among physical servers to achieve load balancing, fault tolerance, and high availability.

Figure 8:
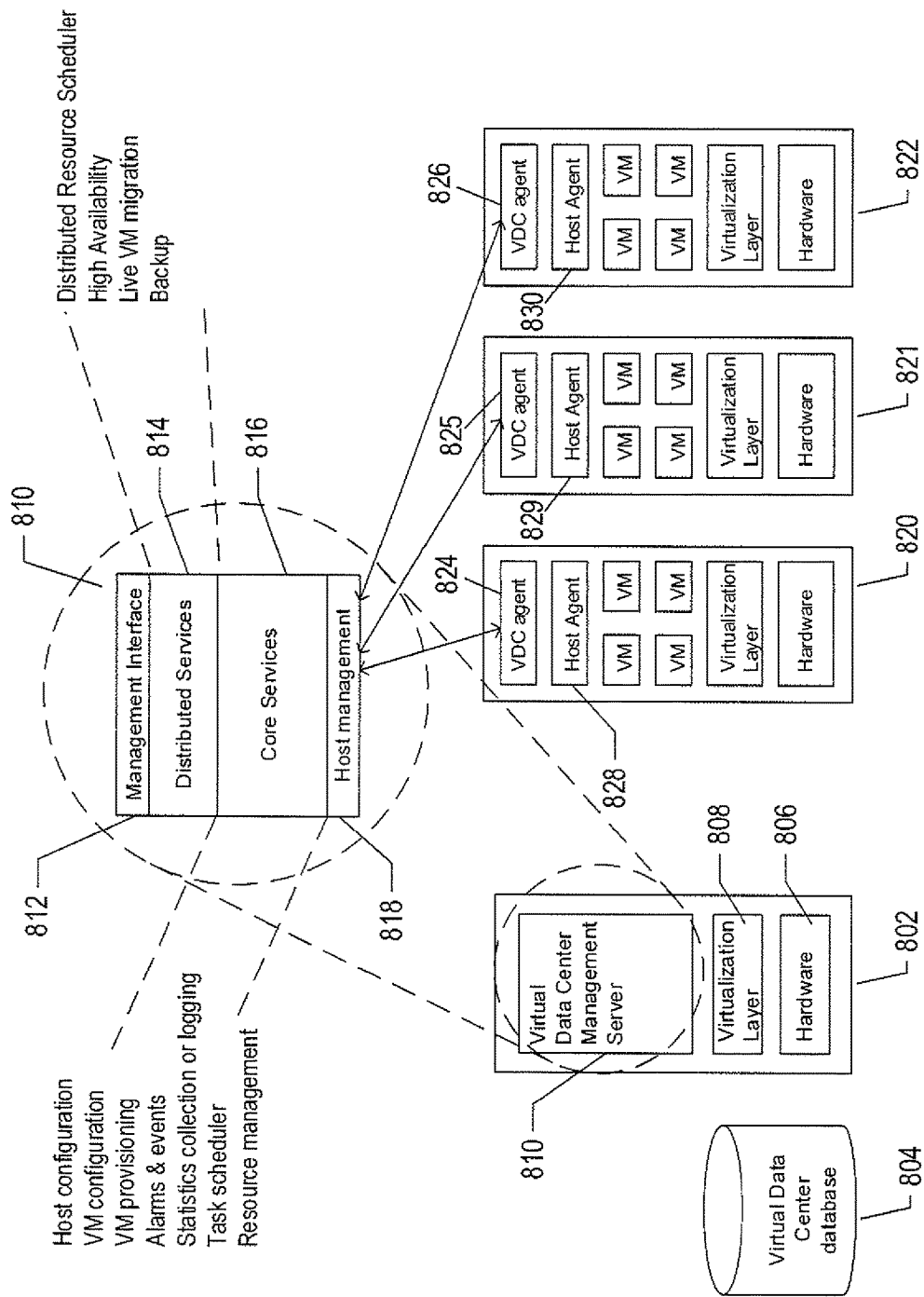
FIG. 8 shows virtual-machine components of a virtual-data-center management server and physical servers of a physical data center.

FIG. 8 shows virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server VM 810 above the virtualization layer. Although shown as a single server in FIG. 8, the virtual-data-center management server ("VDC management server") may include two or more physical server computers that support multiple VDC-management-server virtual appliances. The VM 810 includes a management-interface component 812, distributed services 814, core services 816, and a host-management interface 818. The management interface 818 is accessed from any of various computers, such as the PC 708 shown in FIG. 7. The management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the physical servers of the physical data center that is abstracted to a virtual data center by the VDC management server.

The distributed services 814 include a distributed-device scheduler that assigns VMs to execute within particular physical servers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server, and restarts the VM on the different physical server from a virtual-machine state recorded when execution of the VM was halted. The distributed services 814 also include a distributed backup service that provides centralized virtual-machine backup and restore.

The core services 816 provided by the VDC management server 810 include host configuration, virtual-machine configuration, virtual-machine provisioning, generation of virtual-data-center alarms and events, ongoing event logging and statistics collection, a task scheduler, and a device-management module. Each physical server 820-822 also includes a host-agent VM 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce device allocations made by the VDC management server 810, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
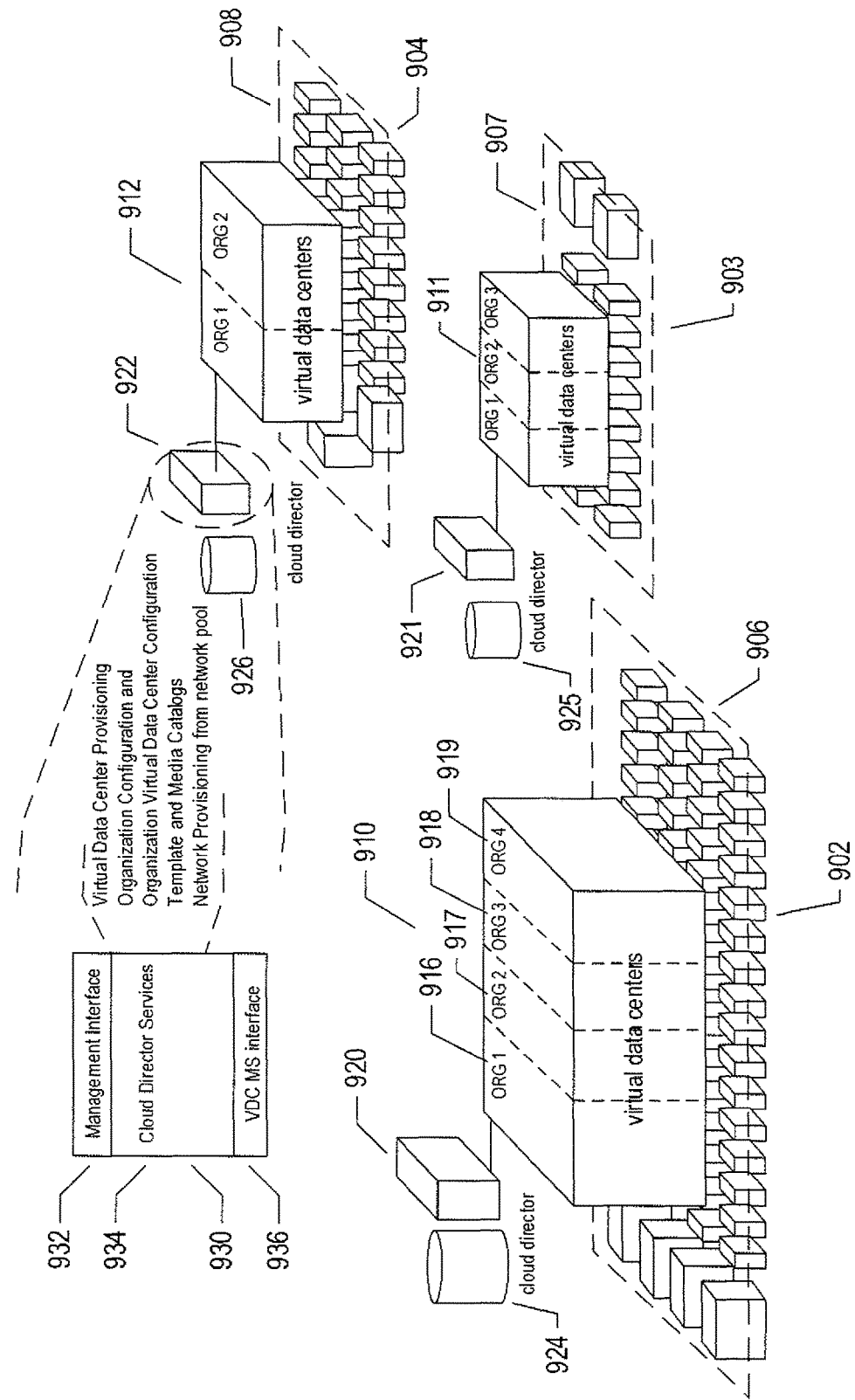
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
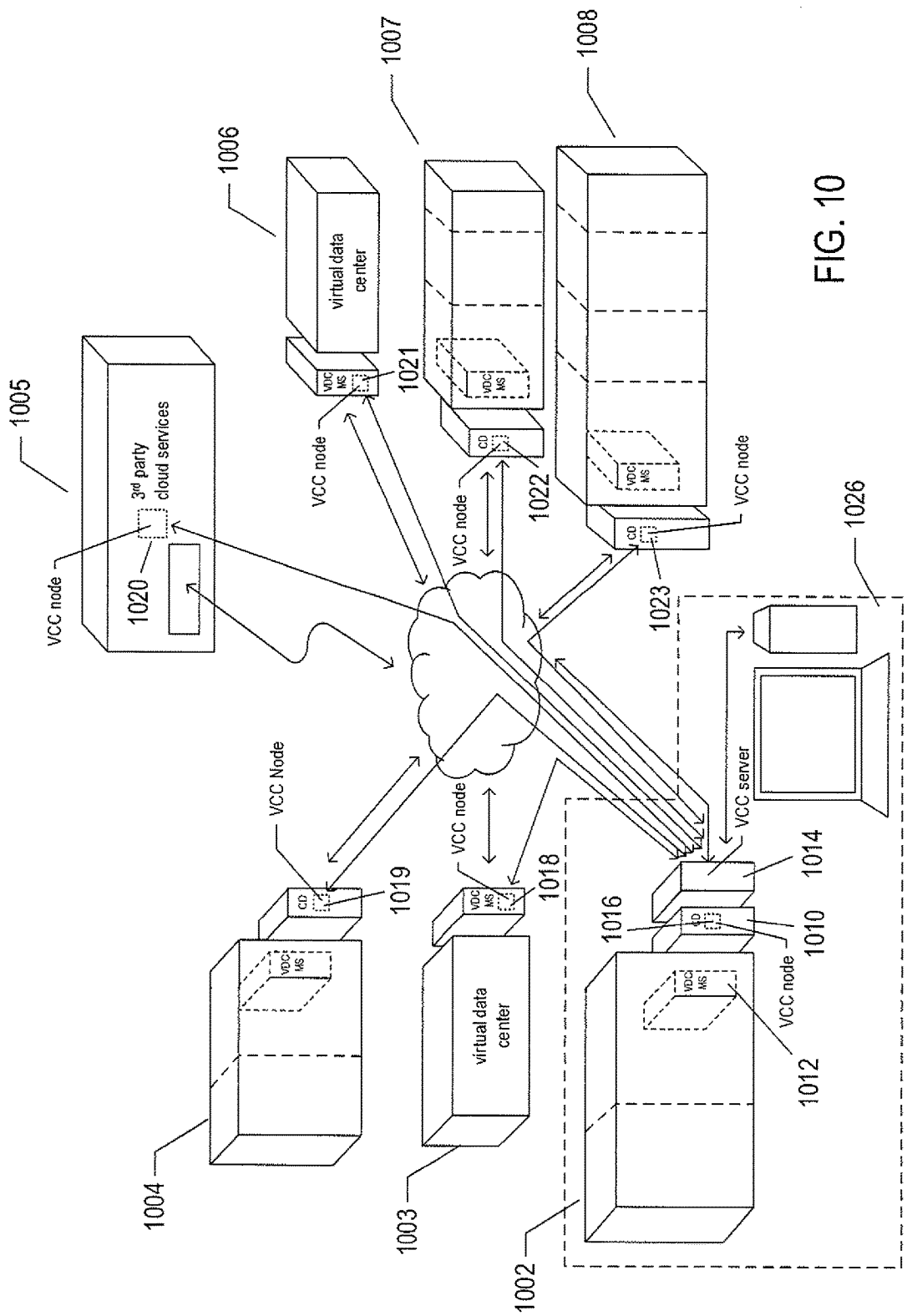
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Methods to Detect Anomalies in Computer System

Figure 11:
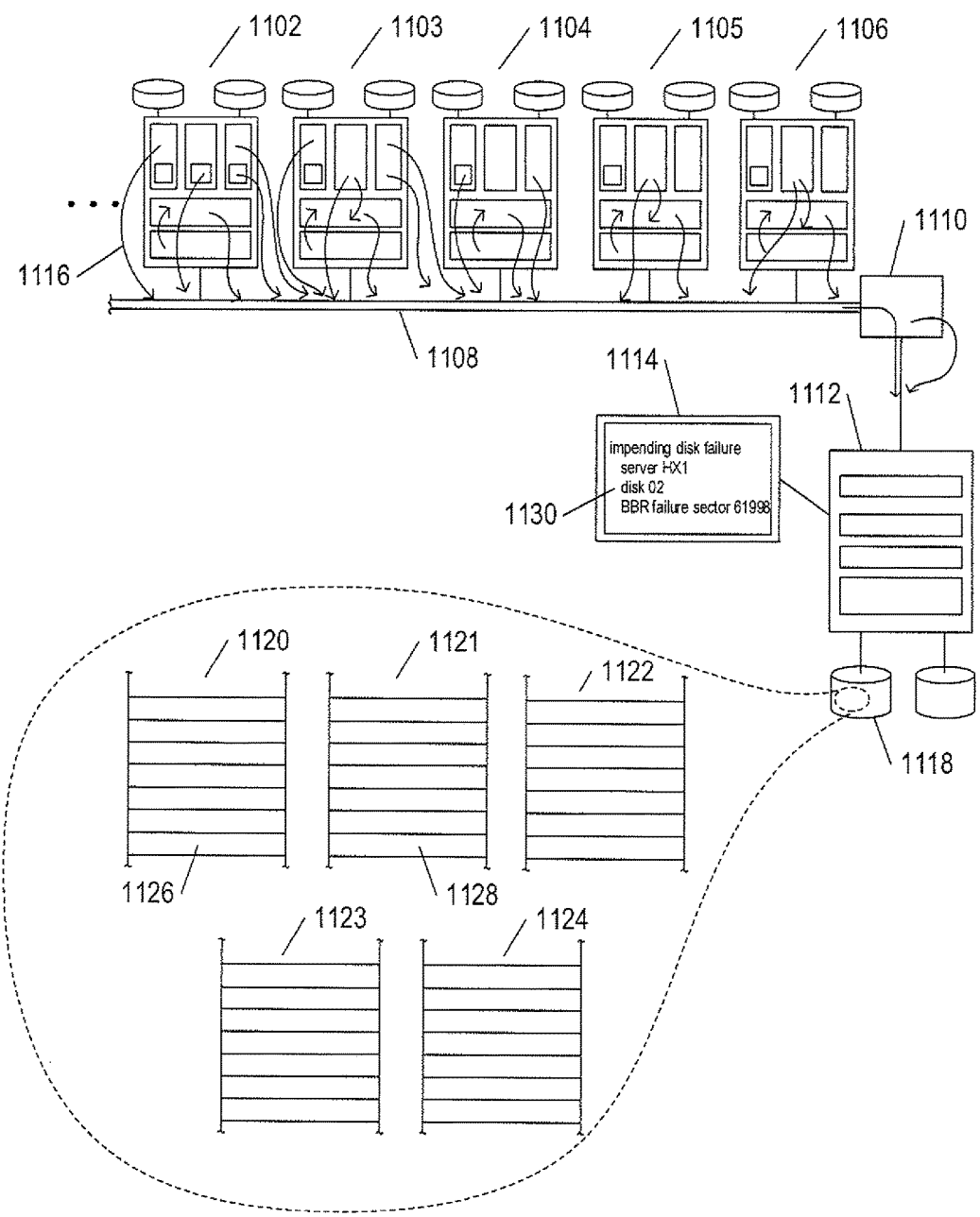
FIG. 11 illustrates a simple example of event-message logging and analysis.

FIG. 11 shows an example of event-message logging and analysis. In FIG. 11, a number of computer systems 1102-1106 within a distributed computing system are linked together by an electronic communications medium 1108 and additionally linked through a communications bridge/router 1110 to an administration computer system 1112 that includes an administrative console 1114. As indicated by curved arrows, such as curved arrow 1116, multiple components within each of the discrete computer systems 1102 and 1106 as well as the communications bridge/router 1110 generate event messages that are transmitted to the administration computer 1112. Event messages may be relatively directly transmitted from a component within a discrete computer system to the administration computer 1112 or may be collected at various hierarchical levels within a discrete computer system and then forwarded from an event-message-collecting entity within the discrete computer system to the administration computer. The administration computer 1112 may filter and analyze the received event messages, as they are received, in order to detect various operational anomalies and impending failure conditions. In addition, the administration computer collects and stores the received event messages in a data-storage device or appliance 1118 as log files 1120-1124. Rectangles, such as rectangles 1126 and 1128, represent individual event messages. For example, log file 1120 is composed of a list of the event messages generated by the computer system 1102. Either through real-time analysis or through analysis of log files, the administration computer 1112 may detect operational anomalies and conditions for which the administration computer 1112 displays warnings and informational displays, such as the warning 1130 displayed on the administrative console 1114.

Figures 12, 13:
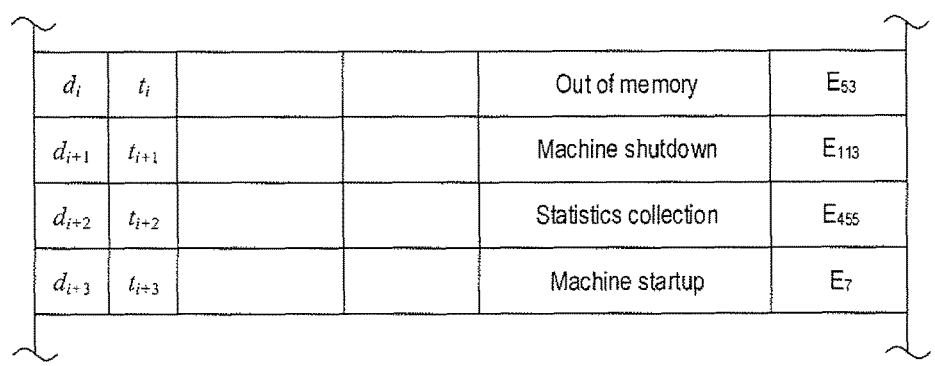
FIG. 12 shows an example of the type of content recorded in a single event message of a log file.
FIG. 13 shows an example of four consecutive event messages in a log file.

FIG. 12 shows an example of the type of content recorded in a single event message 1202 of a log file. In general, event messages are relatively cryptic, including generally only one or two natural-language sentences or phrases as well as various types of file names, path names, and, perhaps most importantly, various alphanumeric parameters. For example, the event message 1202 includes event date 1204 and time 1206, host computer name 1208, host computer IP address 1210, a short natural-language phrase or sentence that describes the event 1212, and numerical parameters that identify the event type 1214. The event date 1204 and time 1206 form a time stamp that indicates when the corresponding event message was recorded in the log file.

FIG. 13 shows an example of four consecutive event messages in a log file. In this example, only the dates, times, short natural-language phrases describing the types of events, and event types are represented. An event type may be an alphanumeric code that represents the type of event message. In the following examples, event types are denoted by $E_s$, where the subscript $s=1, \ldots, S$, and $S$ is a number that represents the total number of different types of event messages that may be recorded in a log file. For example, at date $d_i$ and time $t_i$ the host computer generated an "out of memory" message with a corresponding event type "$E_{53}$," at date $d_{i+1}$ and time $t_{i+1}$ the host computer generated an "machine shutdown" message with a corresponding event type designation "$E_{113}$," at date $d_{i+2}$ and time $t_{i+2}$ the host computer generated an "statistics collection" message with a corresponding event type "$E_{455}$," and at date $d_{i+3}$ and time $t_{i+3}$ the host computer generated an "machine startup" message with a corresponding event type "$E_7$." The dates and times of each event message form a time stamp denoted by T. For example, the date $d_i$ and the time of day $t_i$ of the event message "out of order" is represented by a time stamp $T_i$ in the following discussion.

It should be noted that the phrase "log file" is not intended to mean only operating-system-provided data-storage files, but includes any of many different types of event-message sources. Although, in many cases, event messages are stored in files, they may be alternatively streamed from event-message sources to administrative computers and other event-message sinks within a distributed computer system, stored and transferred in shared memory and distributed shared memory, or stored on physical media that is physically transported from a source computer to a receiving computer. It is convenient, in the following discussion, to diagram and discuss log files as files of log entries that each corresponds to an event message, but, in fact, there are many different types of sources of log-file entries.

There are a number of reasons why event messages, particularly when accumulated and stored by the millions in event-log files or when continuously received at very high rates during daily operations of a computer system, are difficult to automatically interpret and use. A first reason is the volume of data present within log files generated within large, distributed computing systems. As mentioned above, a large, distributed computing system may generate and store terabytes of logged event messages during each day of operation. This represents an enormous amount of data to process, even were the individual event messages highly structured and precisely formatted to facilitate automated processing. However, event messages are not so structured and formatted, which is a second reason that continuously received event messages and event logs are difficult to automatically interpret and analyze. They are even more difficult to manually analyze and interpret, by human system administrators and system analysts. Event messages are generated from many different components and subsystems at many different hierarchical levels within a distributed computer system, from operating system and application-program code to control programs within disk drives, communications controllers, and other such distributed-computer-system components. The event messages may be generated according to a variety of different event-message structuring and formatting approaches used by various different vendors and programmers. Even within a given subsystem, such as an operating system, many different types and styles of event messages may be generated, due to the many thousands of different programmers who contribute code to the operating system over very long time frames. A third reason that it is difficult to process and analyze event messages is that, in many cases, event messages relevant to a particular operational condition, subsystem failure, or other problem represent only a tiny fraction of the total number of event messages that are received and logged. Searching for these relevant event messages within an enormous volume of event messages continuously streaming into an event-message-processing-and-logging subsystem of a distributed computer system may itself be a significant computational challenge. While text-search methodologies may be employed to search for relevant data within large log files, such methods are generally quite time-consuming and imprecise.

Methods generate an alert or warning if and when a computer system exhibits anomalous behavior in real time by comparing previous behavior of the computer system with current behavior of the computer system. In particular, previously generated event messages in the computer system log file establish a recent history. Methods collect recently generated event messages from the same log file and calculate a metric value that represents a difference between the recently generated event messages and the previously generated event messages. If the difference is greater than a threshold, an alert is generated.

Figure 14:
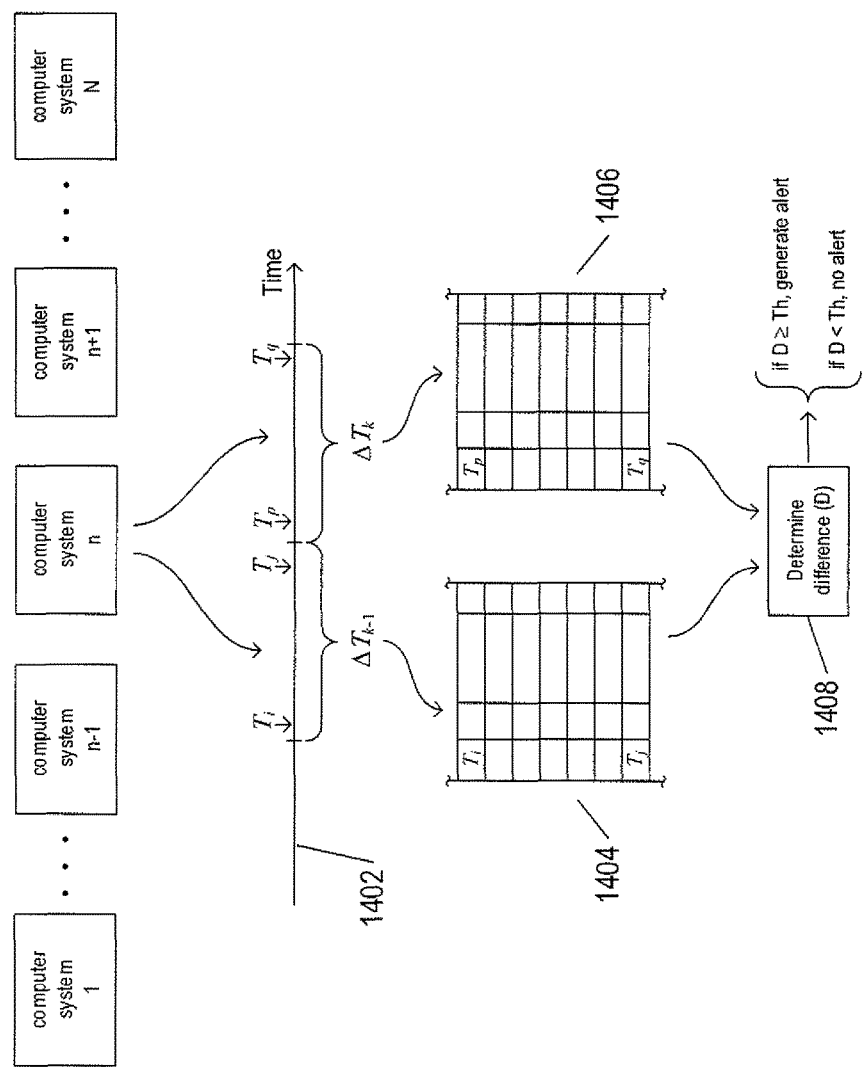
FIG. 14 shows an example cluster of computer systems.

FIG. 14 shows an example cluster of N computer systems. Each computer system generates a log file and sends the log file to an administration computer system (not shown) as described above with reference to FIG. 11. Methods generate an alert if and when a computer system exhibits anomalous behavior based on previously and recently recorded event messages in the log file of the computer system. For example, consider a computer system n of the N computer systems. Directional arrow 1402 represents a time line. A set of event messages 1404 recorded in a time interval $\Delta T_{k-1}$ represents a recent history of behavior for the computer system n. Time stamp $T_i$ represents an earliest time stamp of an event message recorded in the time interval $\Delta T_{k-1}$, and a time stamp $T_j$ represents a latest time stamp of an event message recorded in the time interval $\Delta T_{k-1}$. A set of event messages 1406 recorded in a time interval $\Delta T_k$ represents the behavior for the computer system n in a more recent time interval. Time stamp $T_p$ represents an earliest time stamp of an event message recorded in the time interval $\Delta T_k$, and a time stamp $T_q$ represents a latest time stamp of an event message recorded in the time interval $\Delta T_k$. Block 1408 represents determining a difference, D, between the event messages 1404 and the event messages 1406. The difference D is a value that represents the degree to which the behavior of the computer system n may have changed since event messages were recorded in the previous time interval $\Delta T_{k-1}$. When the difference D is greater than or equal to a threshold, Th, an alert is generated indicating that the computer system n is not behaving normally. Otherwise, as long as D is less than the threshold Th, no alerts are generated and the event messages 1406 collected in the time interval $\Delta T_k$ become the recent history for event messages recorded in a subsequent time interval. This process of determining a difference D and comparing the difference against a threshold is carried out separately for each of the N computer systems.

The difference D may be a measure of the difference between a probability distribution of event types recorded in a previous time interval and a probability distribution of event types recorded in a current or recent time interval. A probability distribution of event messages recorded in a time interval may be determined by counting the number times each event type occurs within the time interval (i.e., event-type frequency) divided by the total number of event types recorded in the time interval.

Figure 15:
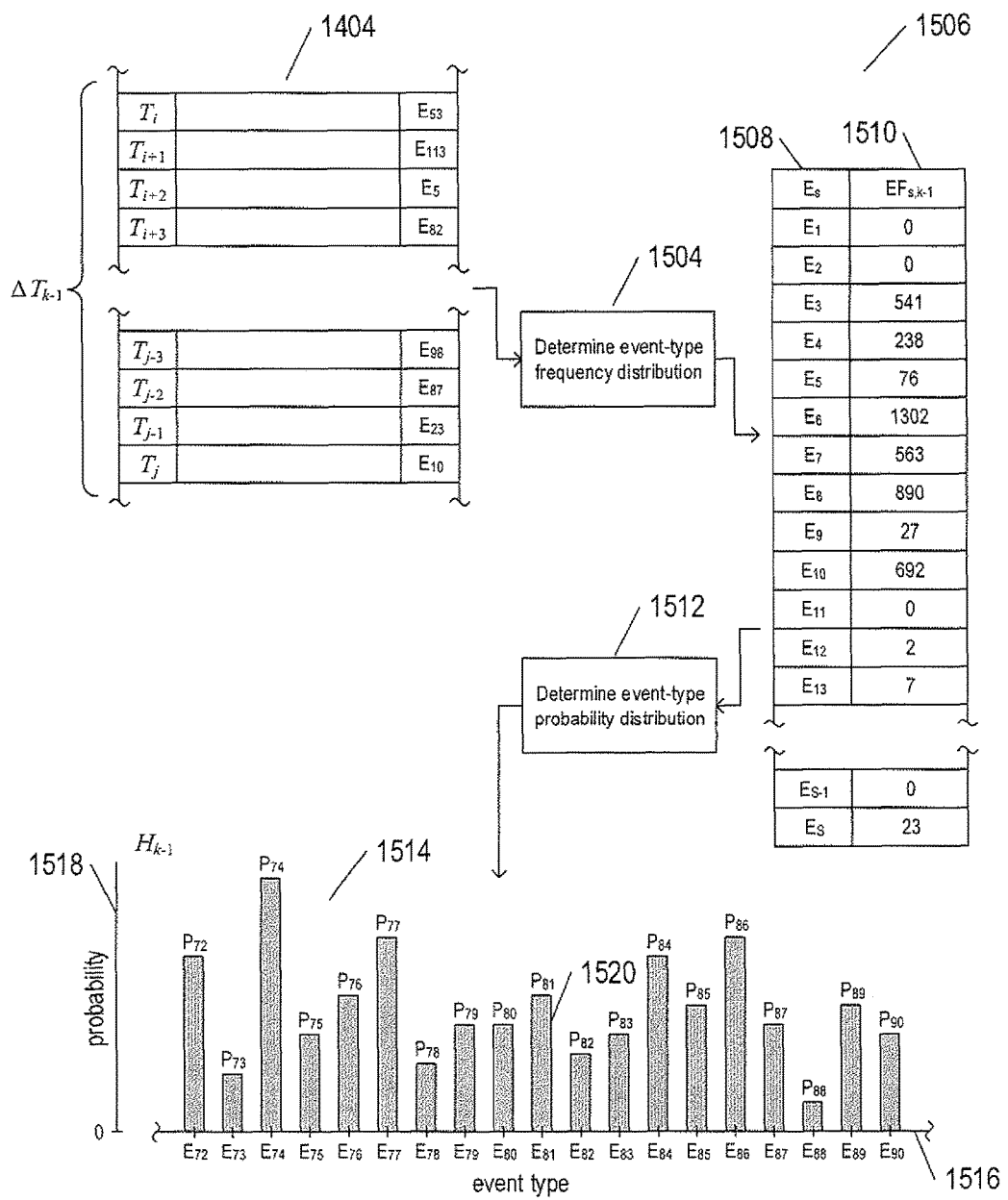
FIG. 15 shows an example of generating a probability distribution for the event messages recorded in a time interval.

FIG. 15 shows an example of generating a probability distribution for the set of event messages 1404 recorded in a time interval $\Delta T_{k-1}$ described in FIG. 14. In this example, $T_i$ and $T_j$ are the time stamps of the earliest and the latest recorded event messages, respectively. An event-type frequency distribution is determined 1504 based on the event types of the event messages 1404 by counting the number of times each event type occurs within the time interval $\Delta T_{k-1}$. FIG. 15 includes an example table 1506 that represents an event-type frequency distribution. Column 1508 is a list of the event types $E_s$. Column 1510 is a list of the event-type frequencies of the event types recorded in the time interval $\Delta T_{k-1}$, where $EF_{s,k-1}$ is the event-type frequency or count of the number of times the event type $E_s$ is recorded in the time interval $\Delta T_{k-1}$. Each row of the table 1506 contains a field with the event type followed by the event-type frequency or count of the number times the event type occurs within the time interval $\Delta T_{k-1}$. For example, event messages with corresponding event type $E_6$ occur with a count of $EF_{6,k-1}$ equal to 1302 times in the time interval $\Delta T_{k-1}$. An event-type probability distribution is determined 1512 from the event-type frequency distribution by computing an event-type probability for each of the event types.

When the time interval $\Delta T_{k-1}$ has elapsed, an event-type probability is calculated for each event type $E_s$ recorded in the time interval $\Delta T_{k-1}$:

$$P_s = \frac{EF_{s,k-1}}{EF_{TOT,k-1}} \quad (1)$$

where $EF_{s,k-1}$ is a count of the number of times the event type $E_s$ is recorded in the time interval $\Delta T_{k-1}$; and $EF_{TOT,k-1}$ is the total number of event messages recorded in the time interval $\Delta T_{k-1}$ (i.e., $EF_{TOT,k-1} = \sum_{s=1}^{S} EF_{s,k-1}$).

The event-type probabilities of the event types recorded in the time interval $\Delta T_{k-1}$ are collected to form an event-type probability distribution:

$$H_{k-1} = \{P_s\}_{s=1}^{S} \quad (2)$$

Returning to FIG. 15, FIG. 15 shows an example histogram 1514 that displays the event-type probabilities of event types between $E_{72}$ and $E_{90}$ of an event-type probability distribution $H_{k-1}$. Axis 1516 is the event-type axis, and axis 1518 is a probability axis. Each bar represents the event-type probability of an event type computed according to Equation (1). For example, bar 1520 represents the probability $P_{81}$ of an event type $E_{81}$ computed according to Equation (1).

When the time interval $\Delta T_{k-1}$ has lapsed, event messages continue to be recorded in a subsequent time interval $\Delta T_k$ as described above with reference to FIG. 14. When the time interval $\Delta T_k$ has elapsed, event-type probabilities are calculated for each of the event types recorded in the time interval $\Delta T_k$:

$$Q_s = \frac{EF_{s,k}}{EF_{TOT,k}} \quad (3)$$

where $EF_{s,k}$ is a count of the number of times the event type $E_s$ recorded in the time interval $\Delta T_k$; and $EF_{TOT,k}$ is the total number of event messages recorded in the time interval $\Delta T_k$ (i.e., $EF_{TOT,k} = \sum_{s=1}^{S} EF_{s,k}$).

The event-type probabilities of the event types recorded in the time interval $\Delta T_k$ are collected to form an event-type probability distribution:

$$H_k = \{Q_s\}_{s=1}^{S} \quad (4)$$

In other words, as time passes, event messages are recorded in a recent time interval denoted by $\Delta T_k$ and an event-type probability distribution $H_k$ is computed for the event types as described above with reference to Equations (3) and (4).

Figure 16:
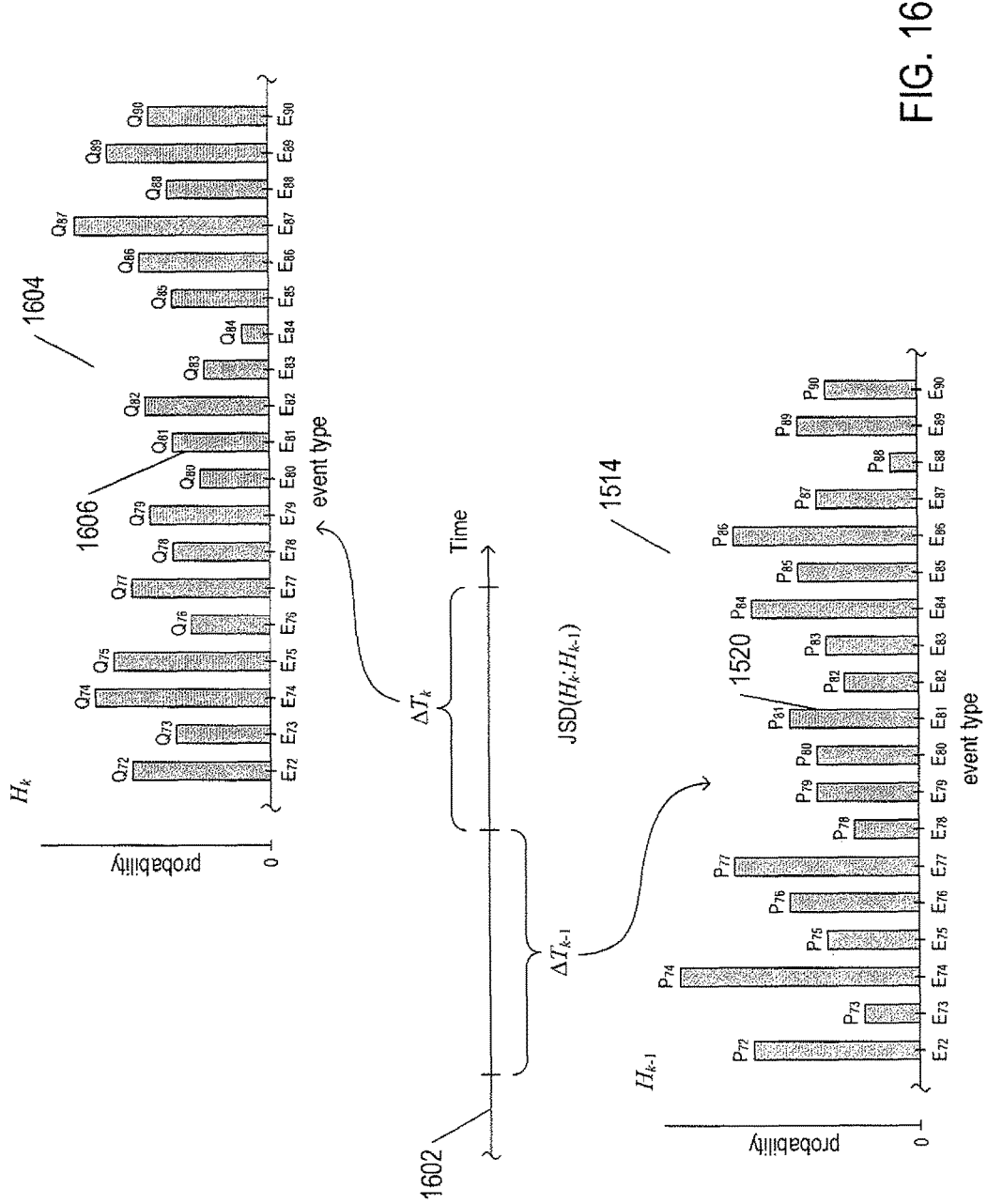
FIG. 16 shows an example of two event-type probability distributions generated for two adjacent time intervals.

FIG. 16 shows an example of two event-type probability distributions generated for two adjacent time intervals $\Delta T_{k-1}$ and $\Delta T_k$. Directional arrow 1602 represents increasing time. In FIG. 16, a time interval denoted by $\Delta T_{k-1}$ represents the time interval in which the set of event messages 1502 are collected and the corresponding event-type probability distribution $H_{k-1}$ 1514 is generated as described above with reference to FIG. 15. An example histogram 1604 displays the event-type probabilities of event types between $E_{72}$ and $E_{90}$ of an event-type probability distribution $H_k$ for the event message 1406 (shown in FIG. 14). Comparison of bars that represent event-type probabilities of corresponding event types reveals how the probability, or frequency of occurrence, of each event may change from the previous time interval $\Delta T_{k-1}$ to the recent time interval $\Delta T_k$. For example, bar 1606 represents the event-type probability of the event type $E_{81}$ occurring in the time interval $\Delta T_k$. Because the length of the bar 1606 is less than the length of the bar 1520, the probability of the event type $E_{81}$ occurring is lower in the recent time interval $\Delta T_k$ than in the previous time interval $\Delta T_{k-1}$.

After the event-type probability distribution $H_k$ has been determined for the time interval $\Delta T_k$, a difference between the two event-type probability distributions $H_k$ and $H_{k-1}$ may be determined by apply a Jensen-Shannon divergence ("JSD"):

$$JSD(H_k : H_{k-1}) = -\sum_{s=1}^{S} M_s \log M_s + \frac{1}{2}\left[\sum_{s=1}^{S} P_s \log P_s + \sum_{s=1}^{S} Q_s \log Q_s\right] \quad (5)$$

where log represents logarithm base 2 (i.e., $\log_2$);

$P_s$ is a probability of the i-th event type in the probability distribution $H_{k-1}$;

$Q_s$ is a probability of the i-th event type in the probability distribution $H_k$; and $M_s = (P_s + Q_s)/2$.

The value of the JSD is bounded by the values 0 and 1:

$$0 \leq JSD(H_k : H_{k-1}) < 1 \quad (6)$$

As the event-type probability distribution $H_k$ approaches the event-type probability distribution $H_{k-1}$, the $JSD(H_k : H_{k-1})$ approaches 0. In other words, as $Q_s$ approaches $P_s$ for all s, the event-type probability distributions $H_k$ and $H_{k-1}$ are essentially indistinguishable and the $JSD(H_k : H_{k-1})$ approaches 0. When $P_s = Q_s$ for all s, $JSD(H_k : H_{k-1}) = 0$. On the other hand, the greater the difference between the event-type probability distributions $H_k$ and $H_{k-1}$, the larger the value of $JSD(H_k : H_{k-1})$. In other words, $JSD(H_k : H_{k-1})$ approaches 1, as the difference between the event-type probability distributions $H_k$ and $H_{k-1}$ increases.

Users may select a threshold, Th, between 0 and 1, as described above with reference to FIG. 14, in order to determine when the difference between event-type probability distribution $H_k$ of the recent time interval $\Delta T_k$ and the event-type probability distribution $H_{k-1}$ of the previous time interval $\Delta T_{k-1}$ is unacceptable and an alert is generated. For example, when $$JSD(H_k : H_{k-1}) \geq Th \quad (7)$$

an alert may be displayed on an administration console 1114, as described above with reference to FIG. 11, indicating that a corresponding computer system is performing anomalously. Otherwise, when $$JSD(H_k : H_{k-1}) < Th \quad (8)$$

no alert is displayed and the computer system may be assumed to be performing as expected.

As the computer system continues to operate and the time interval $\Delta T_k$ has elapsed, a set of event messages are recorded in the log file with time stamps in a subsequent time interval $\Delta T_{k+1}$. These event messages have later time stamps than the time stamps of the event messages recorded in the time interval $\Delta T_k$. The event-type probability distribution $H_{k-1}$ of the time interval $\Delta T_{k-1}$ is discarded. The time interval $\Delta T_k$ is considered the previous time interval such that event-type probabilities $Q_s$ of the event-type probability distribution $H_k$ are assigned to the event-type probabilities $P_s$:

$$P_s \leftarrow Q_s \quad (9)$$

When the time interval $\Delta T_{k+1}$ has elapsed, event-type probabilities are calculated for the event messages recorded in the time interval $\Delta T_{k+1}$ as described above with reference to Equation (3). The event-type probabilities of the event types recorded in the time interval $\Delta T_{k+1}$ are collected to form an event-type probability distribution:

$$H_{k+1} = \{Q_s\}_{s=1}^{S} \quad (10)$$

Figure 17:
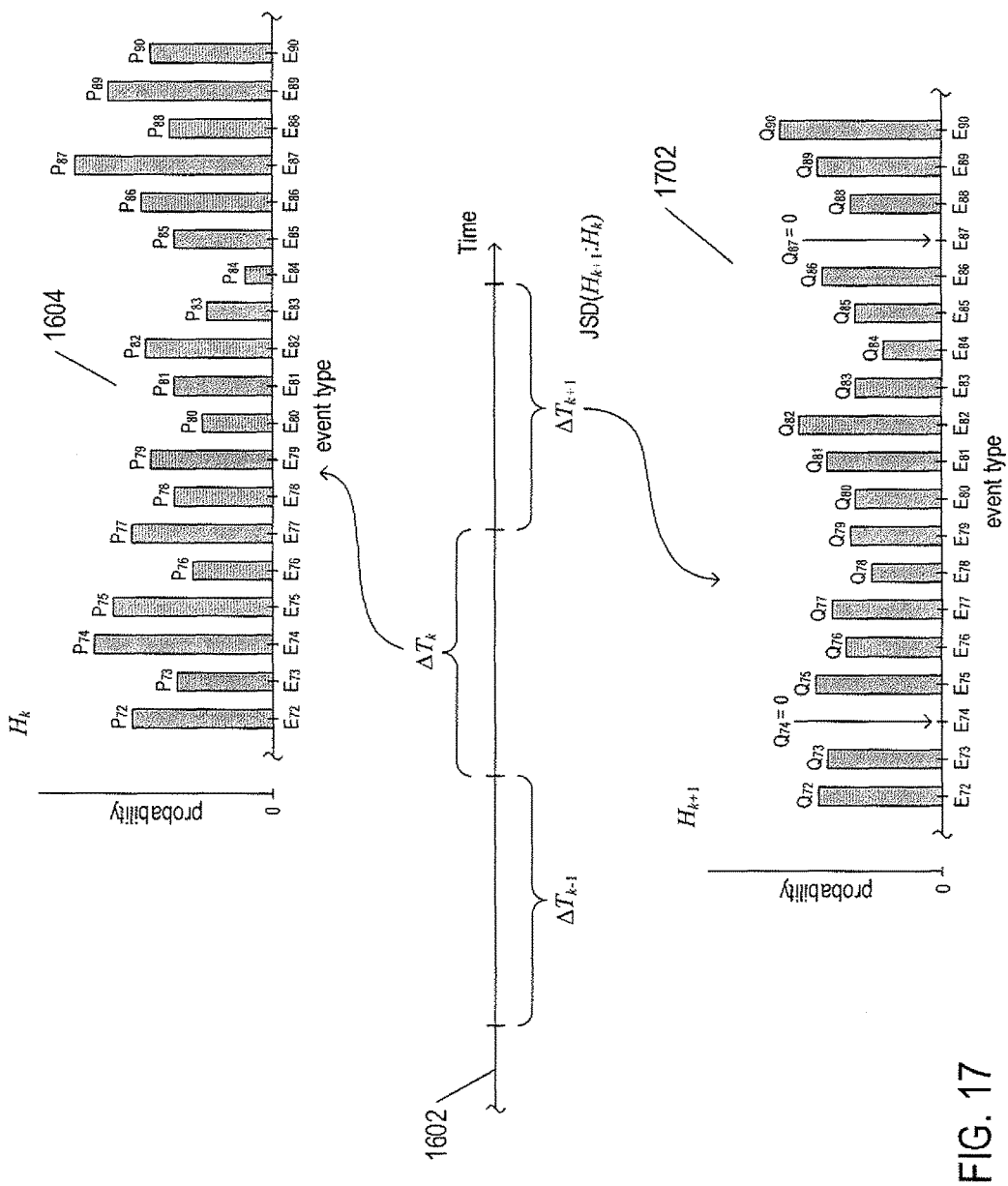
FIG. 17 shows an example of two event-type probability distributions generated for two adjacent time intervals.

FIG. 17 shows the event-type probability distribution 1604 generated for time interval $\Delta T_k$ and an example of an event-type probability distribution 1702 generated for the time interval $\Delta T_{k+1}$. The event-type probabilities of the event-type probability distribution $H_k$ have been reassigned as described above with reference to Equation (9). FIG. 17 also reveals that event messages recorded in one time interval may not be recorded in a subsequent time interval, because the same events may not occur in adjacent time intervals. For example, the event messages represented by event types $E_{74}$ and $E_{87}$ occur in the previous time interval $\Delta T_k$ and are represented as non-zero probabilities $P_{74}$ and $P_{87}$ in the event-type probability distribution $H_k$ 1604.

Because the event types $E_{74}$ and $E_{97}$ are not recorded in the recent time interval $\Delta T_{k+1}$, the corresponding event-type probabilities $Q_{74}$ and $Q_{87}$ are zero in the event-type probability distribution $H_{k+1}$ 1702.

Figure 18A:
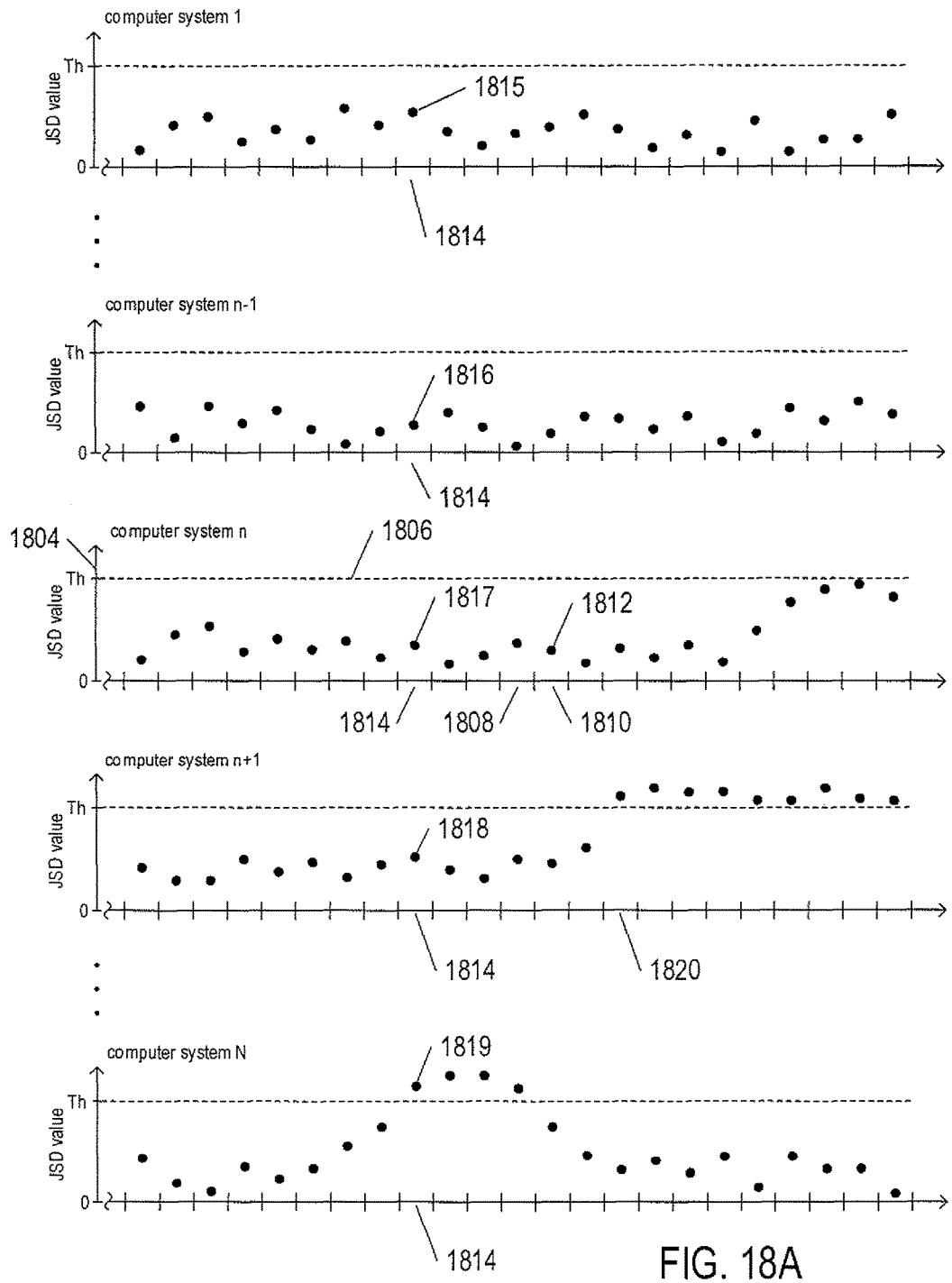
FIGS. 18A-18B show examples of thresholds used to identify anomalously behaving computer systems.

FIG. 18A shows example plots of JSD values calculated for the N computer systems described above with reference to FIG. 14 over time. Horizontal directional arrows, such as directional arrow 1802, represent time, and vertical directional arrows, such as vertical directional arrow 1804, represent a range of JSD values. Each plot includes a threshold, Th, represented by a dashed horizontal line, such as dashed horizontal line 1806. In the example of FIG. 18A, the thresholds used to evaluate the JSD values are fixed and may be selected, such as by an IT manager. The time lines are divided into corresponding time intervals. For example, time axis 1802 is divided in time intervals, such as adjacent time intervals 1808 and 1810. Each dot represents a JSD value calculated as described above with reference to Equation (5) for the event messages recorded in adjacent time intervals. For example, JSD value 1812 generated in the time interval 1810 is calculated from the event-type probability distribution computed from event messages recorded in the time interval 1808 and the event-type probability distribution computed from the event messages recorded in the time interval 1810, as described above with reference the Equation (5) and FIGS. 16 and 17.

In FIG. 18A, the JSD values are computed separately for each of the N computer systems and in the same time intervals, which enables individual computers systems to be simultaneously and separately monitored. For example, in a time interval 1814, the computers systems 1, n−1, n, and n+1 have corresponding JSD values 1815-1818 that are less than the threshold Th. But, the computer system N has a JSD value 1819 that is greater than the threshold Th. As a result, an alert is generated for the computer system N. An alert is also generated in time interval 1820, indicating that the computer system n+1 is behaving anomalously.

Figure 18B:
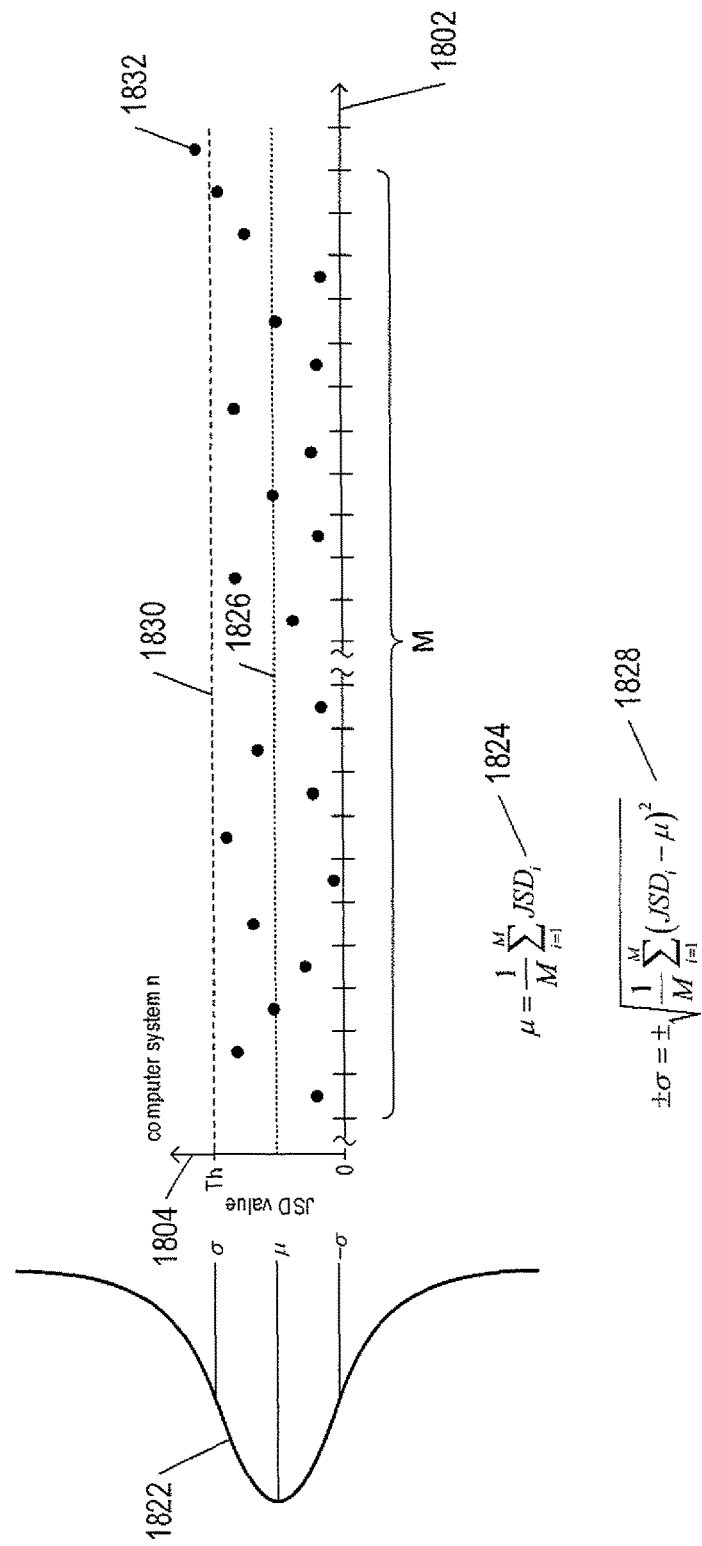

In an alternative implementation, the threshold associated with each computer system may be determined based on a distribution of the M most recently generated JSD values. FIG. 18B shows an example of a threshold, Th, determined for the computer system n based on the $\underline{M}$ most recently generated JSD values. In FIG. 18B, the $\overline{M}$ most recently generated JSD values are assumed to be distributed according to a normal distribution represented by a curve 1822. The normal distribution is centered about a mean JSD value, $\mu$, computed according to equation 1824. Dotted line 1826 represents the mean JSD value $\mu$ for the M most recently generated JSD values. The positive first standard deviation, $\sigma$, from the mean JSD value $\mu$ is computed according to equation 1828 and is used as the threshold (i.e., Th=$\sigma$). Dashed line 1830 represents the positive first standard deviation $\sigma$ and the threshold Th is assigned the value $\sigma$. When the M+1 JSD value is greater than the threshold Th, such as JSD value 1832, an alert is generated.

Figure 19:
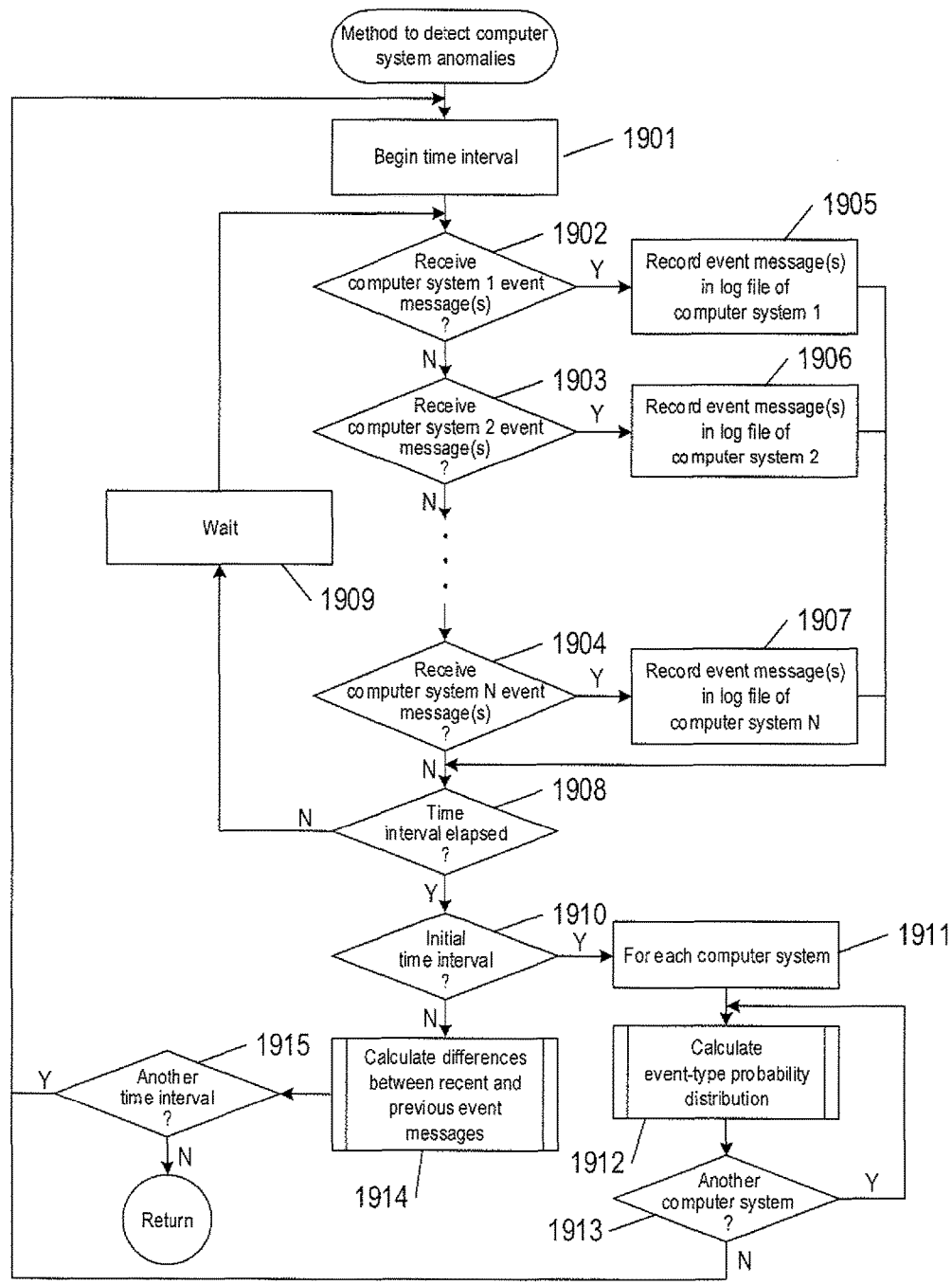
FIG. 19 shows a flow-control diagram of a method to detect computer systems anomalies in a cluster of computers systems.

FIG. 19 shows a flow-control diagram of a method to detect computer systems anomalies in a cluster of computers systems. The method may be carried out by an administration computer systems 1112. In block 1901, a time interval begins, such as the time intervals described above with reference to FIG. 14. Decision blocks 1902-1904 examine the event messages generated by N computer systems and determine which computer system generated each event message based on the host name or IP address encoded in each event message. When an event message is generated by a particular computer system, blocks 1905-1907 record the event message in a corresponding log file. For example, when decision block 1902 identifies an event message as being generated by the computer system 1, block 1905 records the event message in the log file associated with the computer system 1. In decision block 1908, when the time interval has not elapsed, control flows block 1909. Otherwise, control flows to block 1910. In block 1909, a waiting period that is less than the time interval is allowed to pass in order to accumulate more event messages before proceeding to decision blocks 1902-1904. In decision block 1910, when the elapsed time interval is an initial time interval, control flows to a for-loop that begins with block 1911 in which a routine "calculate event-type probability distribution" is called in block 1912 to compute an event-type probability distribution for each of computer systems. In decision block 1913, when an event-type probability distribution has been calculated for each computer systems, control flows back to block 1901. In block 1914, a routine "calculate differences between recent and previous event messages" is called to compute a difference between with the recent and previous event messages as described below with reference to FIG. 21. Otherwise, control flows to block 1901 and event message collection begins in a new time interval.

Figure 20:
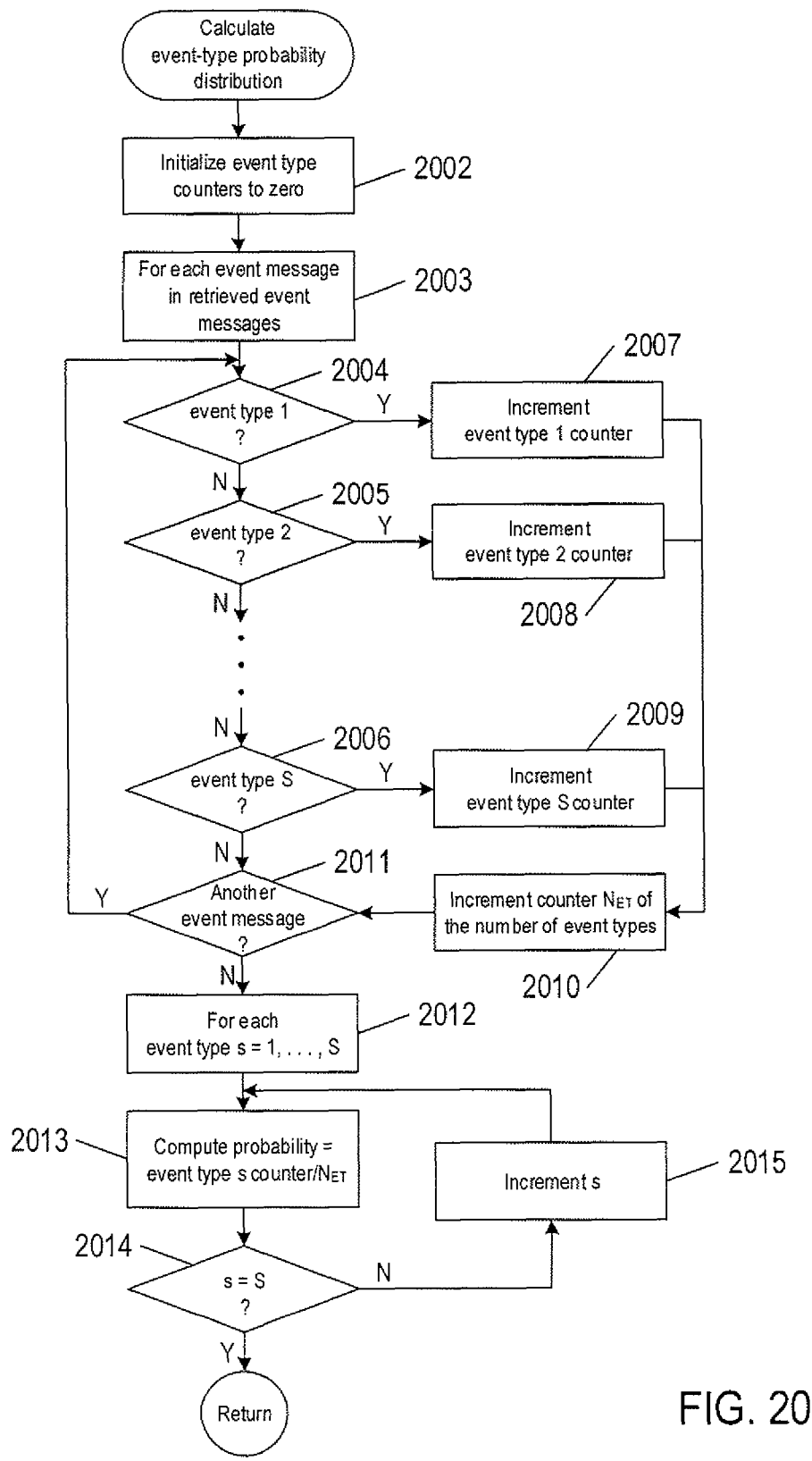
FIG. 20 shows a flow-control diagram of the routine "calculate event-type probability distribution" called in FIG. 19.

FIG. 20 shows a flow-control diagram of the routine "calculate event-type probability distribution" called in block 1912 of FIG. 19. In block 2002, event type counters are initialized to zero. A for-loop beginning with block 2003 counts the different event types. Decision blocks 2004-2006 sort the event types and corresponding blocks 2007-2009 increment event type counters, as described above with reference to FIG. 15. For example, in decision block 2004, when the event type of an event message is an event type 1 (i.e., $E_1$), control flows to block 2007 in which the event type counter is incremented (i.e., $EF_1=EF_{1+1}$), as described above with reference to FIG. 15. In block 2010, each time an event type is counted in blocks 2007-2009, total number of event types counter $N_{ET}$ is incremented. In decision block 2011, the operations represented by blocks 2004-2010 are repeated for another event message. Otherwise, control flows to a for-loop beginning with block 2012. In block 2013, a probability is calculated for each of the event types, as described above with reference to Equation (1) for the initial time interval considered in blocks 1911-1913 of FIG. 19 and according to Equation (3) for subsequent time intervals. In block 2014, when the event type index s does not equal S, control flows to block 2015 in which the event type index s is incremented.

Figure 21:
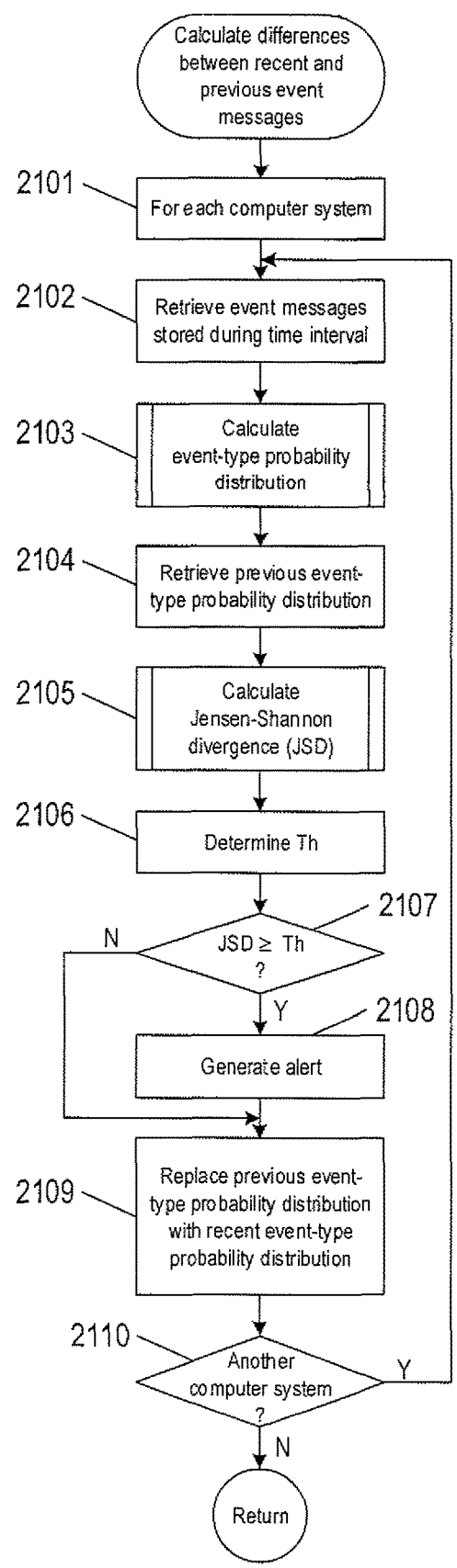
FIG. 21 shows a flow-control of the routine "calculate differences between recent and previous event messages" called in FIG. 19.

FIG. 21 shows a flow-control of the routine "calculate differences between recent and previous event messages" called in block 1914 of FIG. 19. A for-loop beginning with block 2101 repeats the operations represented by blocks 2102-2108 for each of the computer system in the cluster of N computer systems. In block 2102, event messages recorded during the time interval in the log file of the computer system are retrieved. In block 2103, a routine "calculate event-type probability distribution" is called to calculate an event-type probability distribution for the event messages recorded during the time interval. In block 2104, the event-type probability distribution generated in the previous time interval is retrieved. In block 2105, a routine "calculate Jensen-Shannon divergence (JSD)" is called to calculate a JSD value that is a measure of the difference between the previous and recent event-type probability distributions. In block 2106, the threshold Th is determined. For example, the threshold Th may be selected value by an IT manager, or the threshold Th may be determined as the positive first standard deviation from the mean for a normal distribution as described above with reference to FIG. 18B.

In decision block 2107, when the JSD value is greater than a threshold, Th, as described above with reference Equation (7), control flows to block 2108 and an alert is generated on an administration computer system console. In block 2109, the previous event-type probability distribution is replaced by the recent event-type probability distribution. In decision block 2110, the operations represented by blocks 2102-2109 are repeated for another computer system of the cluster.

Figure 22:
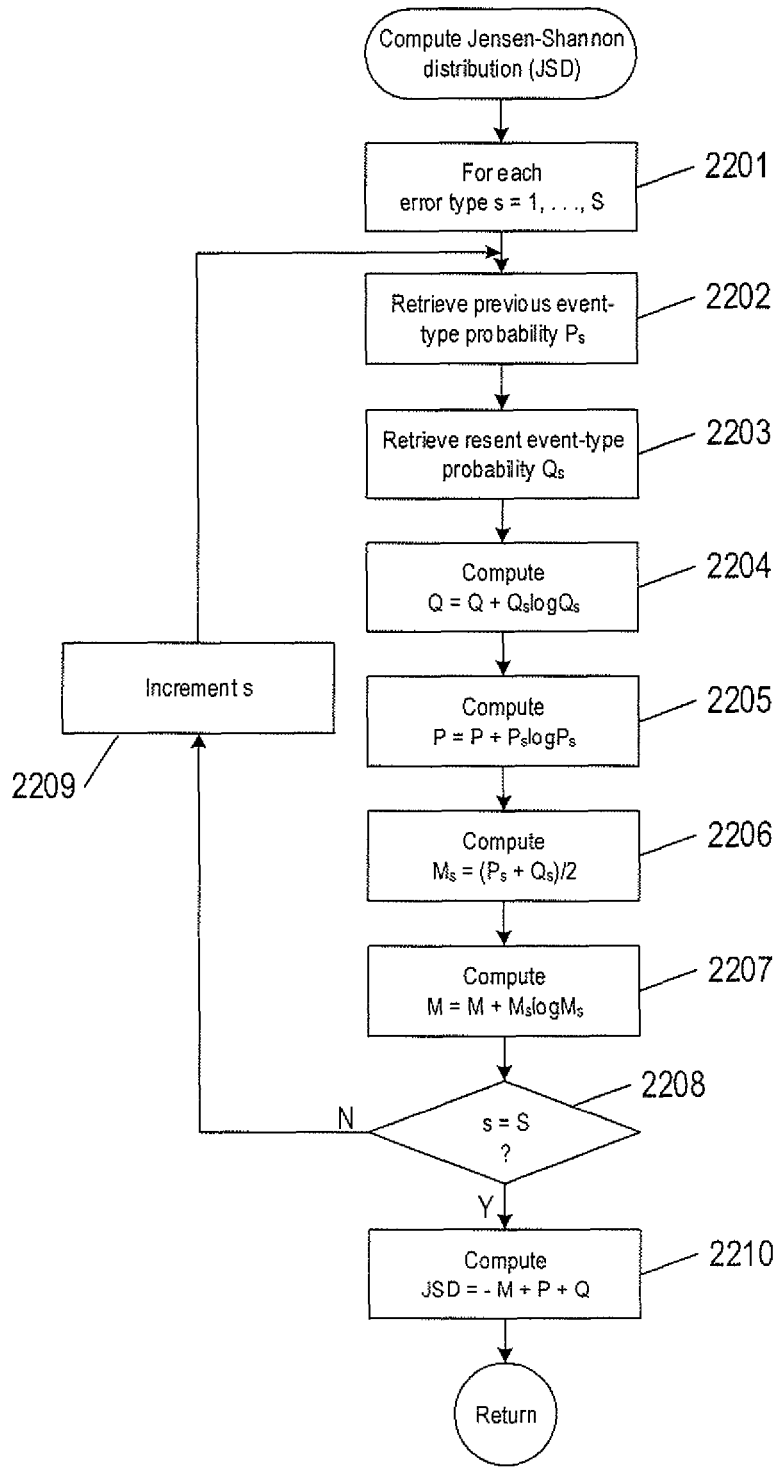
FIG. 22 shows a flow-control diagram of the routine "calculate Jensen-Shannon distribution ("JSD")" called in FIG. 21.

FIG. 22 shows a flow-control diagram of the routine "calculate Jensen-Shannon distribution ("JSD") called in block 2105 of FIG. 21. A for-loop beginning with block 2201 calculates the summation terms of the JSD described above with reference to Equation (5) for each of the event types. In block 2202, event-type probabilities $P_s$ that comprise the event-type probability distribution of the previous time interval are retrieved from memory. In block 2203, event-type probabilities $Q_s$ that comprise the event-type probability distribution of the previous time interval are retrieved from memory. In block 2204, the summation over $Q_s \log Q_s$ is computed. In block 2205, the summation over $P_s \log P_s$ is computed. In block 2206, the average $M_s$ of the probabilities $Q_s$ and $P_s$ are computed. In block 2207, the summation over $M_s \log M_s$ is computed. In decision block 2208, when s does not equal S, control flows to block 2209. In block 2209, the event type index s is incremented and the operations represented by blocks 2202-2207 are repeated. When the operations in blocks 2202-2207 have been repeated for each of the event types, in block 2210 the Jensen-Shannon divergence (JSD) is calculated.

Although the present invention has been described in terms of particular embodiments, it is not intended that the invention be limited to these embodiments. Modifications within the spirit of the invention will be apparent to those skilled in the art. For example, any of many different design and implementation parameters may be varied in order to generate alternative implementations of the above-discussed method, including hardware platform, operating system, virtualization method, modular organization, control structures, data structures, and other such parameters. While the Jensen-Shannon divergence metric is a compelling metric for comparing log-file-based probability distributions, other metrics may be used in alternative implementations. As discussed above, probability distributions of event types or error-code values of log-file entries can be used for determining and monitoring the states of computer systems and distributed computer systems in a variety of different applications for a variety of different purposes. As discussed above, although many examples have been provided in which the measured divergence between probability distributions based on event-message types observed during particular time intervals is indicative of the difference between states of distributed computer systems during the particular time intervals, the divergence between probability distributions can be used as a comparison metric for any two subsets of log-file entries specified by two different queries.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A process stored in one or more data-storage devices and executed using one or more processors of a computer system to detect anomalies in behavior of a computer system of a distributed computing system, the method comprising:
   assigning each event message generated by the computer system to a time interval of a series of time intervals, each event message having a time stamp in the time interval the event message is assigned to; and
   when a most recent time interval of the series of time intervals has elapsed,
      calculating a difference between a set of event messages with time stamps in the most recent time interval and a set of event messages with time stamps in a previous time interval of the series of time intervals that precede the most recent time interval, and
      when the difference is greater than a threshold, generating an alert on an administrative computer console that indicates the computer system exhibits anomalous behavior and migrating one or more virtual machines from the computer system to another computer system within the distributing computing system.

2. The process of claim 1, wherein the series of time intervals are adjacent time intervals.

3. The process of claim 1, wherein calculating the difference further comprises:
   retrieving a first event-type probability distribution of the set of event messages with time stamps in the previous time interval;
   calculating a second event-type probability distribution of the set of event messages with time stamps in the most recent time interval;
   calculating a Jensen-Shannon divergence between the first and second event-type probability distributions, the Jensen-Shannon divergence is the difference; and
   replacing the first event-type probability distribution with the second event-type probability distribution in preparation for a subsequent time interval.

4. The process of claim 3, wherein calculating the second event-type probability distribution further comprises:
   for each event type of the set of event messages with time stamps in the most recent time interval, incrementing an event-type counter associated with each event type;
   for each event type, dividing the event-type counter by a total number of event types with time stamps in the recently elapsed time to calculate an event-type probability; and
   collecting the event-type probabilities to form an event-type probability distribution for the recently elapsed time interval.

5. The process of claim 1, further comprising:
   for each set of event messages with time stamps in a first time interval of the series of one or more time intervals, incrementing an event-type counter associated with each event type of the event messages;
   for each event type, dividing the event-type counter by a total number of event types with time stamps in the first time interval to calculate an event-type probability; and
   collecting the event-type probabilities to form an event-type probability distribution for the first time interval.

6. The process of claim 1, further comprising calculating the threshold as a first positive standard deviation of a number of the most recently generated Jensen-Shannon divergence.

7. The process of claim 1, further comprises applying the method of claim 1 to each computer system of a cluster of computer systems.

8. A system to detect anomalies in behavior of a computer system of a distributed computing system, the system comprising:
one or more processors;
one or more data-storage devices; and
machine-readable instructions stored in the one or more data-storage devices that when executed using the one or more processors controls the system to carry out
receiving event messages generated by event-message sources of the computer system;
assigning each event message to a time interval of a series of time intervals, each event message having a time stamp in the time interval the event message is assigned to; and
when a most recent time interval of the series of time intervals has elapsed,
calculating a difference between a set of event messages with time stamps in the most recent time interval and a set of event messages with time stamps in a previous time interval of the series of time intervals that precede the most recent time interval, and
when the difference is greater than a threshold, generating an alert on an administrative computer console that indicates the computer system exhibits anomalous behavior and migrating one or more virtual machines from the computer system to another computer system within the distributing computing system.

9. The system of claim 8, wherein the series of time intervals are adjacent time intervals.

10. The system of claim 8, wherein calculating the difference further comprises:
retrieving a first event-type probability distribution of the set of event messages with time stamps in the previous time interval;
calculating a second event-type probability distribution of the set of event messages with time stamps in the most elapsed recent time interval;
calculating a Jensen-Shannon divergence between the first and second event-type probability distributions, the Jensen-Shannon divergence is the difference; and
replacing the first event-type probability distribution with the second event-type probability distribution in preparation for a subsequent time interval.

11. The system of claim 10, wherein calculating the second event-type probability distribution further comprises:
for each event type of the set of event messages with time stamps in the recently elapsed time interval, incrementing an event-type counter associated with each event type;
for each event type, dividing the event-type counter by a total number of event types with time stamps in the recently elapsed time to calculate an event-type probability; and
collecting the event-type probabilities to form an event-type probability distribution for the recently elapsed time interval.

12. The system of claim 8, further comprising:
for each set of event messages with time stamps in a first time interval of the series of one or more time intervals, incrementing an event-type counter associated with each event type of the event messages;
for each event type, dividing the event-type counter by a total number of event types with time stamps in the first time interval to calculate an event-type probability; and
collecting the event-type probabilities to form an event-type probability distribution for the first time interval.

13. The system of claim 8, further comprising calculating the threshold as a first positive standard deviation of a number of the most recently generated Jensen-Shannon divergence.

14. The system of claim 8, further comprises applying the method of claim 1 to each computer system of a cluster of computer systems.

15. A non-transitory computer-readable medium encoded with machine-readable instructions that implement a method carried out by one or more processors of a computer system to perform the operations of
assigning each event message generated by the computer system to a time interval of a series of time intervals, each event message having a time stamp in the time interval the event message is assigned to; and
when a most recent time interval of the series of time intervals has elapsed,
calculating a difference between a set of event messages with time stamps in the most recent time interval and a set of event messages with time stamps in a previous time interval of the series of time intervals that precede the most recent time interval, and
when the difference is greater than a threshold, generating an alert on an administrative computer console that indicates the computer system exhibits anomalous behavior and migrating one or more virtual machines from the computer system to another computer system within the distributing computing system.

16. The medium of claim 15, wherein the series of time intervals are adjacent time intervals.

17. The medium of claim 15, wherein calculating the difference further comprises:
retrieving a first event-type probability distribution of the set of event messages with time stamps in the previous time interval;
calculating a second event-type probability distribution of the set of event messages with time stamps in the most recent time interval;
calculating a Jensen-Shannon divergence between the first and second event-type probability distributions, the Jensen-Shannon divergence is the difference; and
replacing the first event-type probability distribution with the second event-type probability distribution in preparation for a subsequent time interval.

18. The medium of claim 17, wherein calculating the second event-type probability distribution further comprises:
for each event type of the set of event messages with time stamps in the most recent time interval, incrementing an event-type counter associated with each event type;
for each event type, dividing the event-type counter by a total number of event types with time stamps in the recently elapsed time to calculate an event-type probability; and
collecting the event-type probabilities to form an event-type probability distribution for the recently elapsed time interval.

19. The medium of claim 15, further comprising:
for each set of event messages with time stamps in a first time interval of the series of one or more time intervals, incrementing an event-type counter associated with each event type of the event messages;

for each event type, dividing the event-type counter by a total number of event types with time stamps in the first time interval to calculate an event-type probability; and collecting the event-type probabilities to form an event-type probability distribution for the first time interval.

20. The medium of claim 15, further comprising calculating the threshold as a first positive standard deviation of a number of the most recently generated Jensen-Shannon divergence.

21. The medium of claim 15, further comprises applying the method of claim 1 to each computer system of a cluster of computer systems.

* * * * *